United States Patent
Kawano

(10) Patent No.: US 11,394,073 B2
(45) Date of Patent: Jul. 19, 2022

(54) BATTERY SYSTEM AND VEHICLE EQUIPPED WITH BATTERY SYSTEM

(71) Applicant: SANYO Electric Co., Ltd., Daito (JP)

(72) Inventor: Tsuyoshi Kawano, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 86 days.

(21) Appl. No.: 16/629,089

(22) PCT Filed: Jul. 5, 2018

(86) PCT No.: PCT/JP2018/025431
§ 371 (c)(1),
(2) Date: Jan. 7, 2020

(87) PCT Pub. No.: WO2019/021779
PCT Pub. Date: Jan. 31, 2019

(65) Prior Publication Data
US 2020/0194750 A1   Jun. 18, 2020

(30) Foreign Application Priority Data

Jul. 24, 2017   (JP) .............................. JP2017-142557

(51) Int. Cl.
*H01M 50/20* (2021.01)
*H01M 10/613* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC ............. H01M 10/613; H01M 10/625; H01M 10/647; H01M 10/6555; H01M 10/6557; H01M 10/6563
See application file for complete search history.

(56) References Cited

U.S. PATENT DOCUMENTS

2003/0211384 A1* 11/2003 Hamada ............. H01M 10/617
429/120
2012/0003526 A1* 1/2012 Kume ................... H01M 50/20
429/151
(Continued)

FOREIGN PATENT DOCUMENTS

CN   102315401 A   1/2012
CN   105322214 A   2/2016
(Continued)

OTHER PUBLICATIONS

International Search Report dated Sep. 11, 2018, issued in counterpart application No. PCT/JP2018/025431, with English translation. (4 pages).
(Continued)

*Primary Examiner* — Jimmy Vo
(74) *Attorney, Agent, or Firm* — WHDA, LLP

(57) ABSTRACT

A battery system includes a battery stack, a pair of end plates, a pair of binding bars, and a pair of ducts. The battery stack includes a plurality of battery cells and separators being stacked alternatively one by one and has openings on both longer sides. The opening communicates with a cooling path. The end plates are disposed on both shorter sides of the battery stack. Each of the pair of binding bars includes openings that faces the openings of the battery stack. A duct covers the openings of the binding bar, and guides the cooling air. The duct includes openings that is formed along the openings. In the separator, blocking parts are formed, and the blocking part protrudes in a direction of both sides along the opening. The blocking parts cover the opening ends of the opening and the opening ends of the openings.

11 Claims, 14 Drawing Sheets

(51) Int. Cl.
*H01M 10/625* (2014.01)
*H01M 10/647* (2014.01)
*H01M 10/6555* (2014.01)
*H01M 10/6557* (2014.01)
*H01M 10/6563* (2014.01)

(52) U.S. Cl.
CPC ..... *H01M 10/647* (2015.04); *H01M 10/6555* (2015.04); *H01M 10/6557* (2015.04); *H01M 10/6563* (2015.04)

(56) References Cited

U.S. PATENT DOCUMENTS

2016/0036105 A1   2/2016   Toshioka et al.
2018/0138560 A1   5/2018   Bessho

FOREIGN PATENT DOCUMENTS

| | | |
|---|---|---|
| JP | 2006-286547 A | 10/2006 |
| JP | 2016-31901 A | 3/2016 |
| JP | 2016-225136 A | 12/2016 |
| WO | 2017/017914 A1 | 2/2017 |

OTHER PUBLICATIONS

English Translation of Search Report dated Dec. 9, 2021, issued in counterpart CN Application No. 201880049357.5. (2 pages).

\* cited by examiner

BATTERY SYSTEM AND VEHICLE EQUIPPED WITH BATTERY SYSTEM

TECHNICAL FIELD

The present invention relates to a battery system in which battery stacks are formed by stacking a plurality of battery cells with cooling paths provided between the battery cells, and a vehicle equipped with this battery system. Cooling air is forcibly blown into the cooling paths so that the battery cells are cooled down.

BACKGROUND ART

A battery system can have a high output voltage by connecting many battery cells in series, or can have a large charge and discharge current by connecting the battery cells in parallel. Accordingly, in a battery system for a large current and a large output that is used in a hybrid vehicle, an electric automobile, and other vehicles, a plurality of battery cells is connected in series, so that output voltage is increased. A battery system used for the purpose is charged or discharged at a large current, and generates heat. Therefore, it is necessary that battery cells be forcibly cooled down. In order to achieve the above, a battery system has been developed in which battery stacks are formed by stacking a plurality of battery cells with cooling paths provided between the battery cells. (See PTL 1)

PRIOR ART DOCUMENTS

Patent Literature

PTL 1: Unexamined Japanese Patent Publication No. 2006-286547

SUMMARY OF THE INVENTION

In this battery system, the battery stacks are formed by stacking the plurality of battery cells with separators between the battery cells alternatively one by one in such a way that cooling paths are formed. Cooling air is blown into the cooling paths, and the battery cells are cooled down from the surfaces. Accordingly, in this battery system, many battery cells that have been stacked can be cooled down by using cooling air that is blown into the cooling paths. In this battery system, a binding bar is disposed in each of both sides of the battery stack. Therefore, cooling air passes through openings in one of the binding bars, and is supplied into the cooling paths. The cooling air passes through openings in the other of the binding bars, and is exhausted to an outside.

As described above, in a battery system that blows cooling air through the openings in a binding bar into cooling paths, openings 140 are provided in binding bar 104 so as to let air through binding bar 104, as illustrated in FIG. 14. Further, in the battery system of FIG. 14, duct 106 is disposed outside binding bar 104 in order to blow cooling air through openings 140 of binding bar 104. Duct 106 is disposed so as to cover openings 140 of binding bar 104. Cooling air is forcibly blown into the duct, and the cooling air is blown into cooling paths 108.

In the battery system described above, cooling air that is forcibly blown into duct 106 via a blower (not illustrated) passes through openings in a binding bar, and flows into each of cooling paths 108 of battery stack 110. In addition, the cooling air that is passed through each of cooling paths 108 flows via openings 140 on the opposite side into duct 106, and is exhausted (see arrow A in FIG. 14). However, this battery system has a problem in which gaps are formed between binding bar 104 and battery stack 110 and between binding bar 104 and duct 106. In battery stack 110, many battery cells 101 are stacked, and further the battery cells 101 and separators 102 are stacked alternatively one by one. Battery cell 101 and separator 102 have manufacturing tolerance, and therefore binding bar 104 and battery stack 110 fail to be in contact with each other air tightly. Binding bar 104 and duct 106 fail to be in contact with each other air tightly at a boundary between binding bar 104 and duct 106. In particular, in a battery system mounted on a vehicle, a state of these gaps subtly changes due to vibration during travelling, and therefore it is more difficult to keep an airtight contact state to avoid inflow of air.

Such a gap that is formed between a binding bar and a battery stack or between a binding bar and a duct causes inflow of air, and this gap hinders effectively cooling down battery cells by using forcibly blown cooling air. In particular, in a case where a fan is disposed on an exhaust duct, in contrast to intended intake air for cooling that is supplied from an inflow duct, inflow of air from a gap between a binding bar and a battery stack or between the binding bar and the duct is unintended intake air (see arrow B in FIG. 14). Air that is different from air for cooling is sucked and this causes a failure in efficient cooling. For example, in a battery system that sucks air in a cabin as air for cooling, air that has been adjusted to have an appropriate temperature in the cabin is sucked as the air for cooling. However, inflow of air from a gap between a binding bar and a battery stack or between a binding bar and a duct is air in a space where the battery system is installed, and the air has not always been adjusted to have an appropriate temperature. Therefore, temperature of air in such a space may increase to a temperature that is not appropriate for cooling depending on a location where the battery system is installed, and there is a possibility that suction of such an air will cause a significant reduction in cooling efficiency. In addition, there is a problem in which a blowing volume increases due to the unintended intake air, and therefore a load on a blower increases, and power consumption of the blower increases.

The present invention has been developed in order to solve the disadvantages described above. It is an object of the present invention to provide a battery system that is capable of effectively avoiding inflow of air from gaps between a binding bar and a battery stack and between the binding bar and a duct, efficiently blowing cooling air into cooling paths between battery cells, and efficiently cooling down the battery cells by using the cooling air in a simple structure, and a vehicle equipped with this battery system.

A battery system in a first aspect of the present invention includes a battery stack, a pair of end plates, a pair of binding bars, and a pair of ducts. The battery stack includes a plurality of battery cells and separators being stacked alternatively one by one and has openings on both sides of the battery stack. The plurality of battery cells has a prismatic shape, and is stacked in a thickness direction. The separator has insulation, and is interposed between the adjacent battery cells to form cooling paths between the battery cells. The openings communicate with a plurality of cooling paths. The pair of end plates are respectively disposed on both shorter sides of the battery stack. The pair of binding bars are disposed on both sides of the battery stack. Both ends of the pair of binding bars are fixed to the pair of end plates. Each of the pair of binding bars includes openings that are open to face the openings in such a way that cooling air can flow into the plurality of cooling paths. The duct is disposed on both sides of the battery stack, covers the openings of the binding bar, and guides the cooling air that cools down the battery cells. The battery system forcibly blows cooling air into the duct, and cools down the battery cells. The duct includes openings that are formed along the openings that are open in the binding bars. Opening ends of the openings and opening ends of the openings are close to each other. In the separator, blocking parts are formed, and the blocking parts protrude in a direction of both sides of the battery stack along the openings. This blocking part is inserted into the opening, and covers the opening end of the opening and the opening end of the opening.

In the present description, both sides of a battery stack mean both sides of a plurality of battery cells stacked in a thickness direction.

In the configuration described above, facing opening ends of an inflow opening of a duct and openings of a binding bar are covered with blocking parts of separators, and therefore a situation can be suppressed where cooling capability is reduced due to inflow of air from gaps between the duct and the binding bar and between the separators and the binding bar, and highly efficient cooling capability can be achieved. In addition, by effectively avoiding inflow of air during forcible blowing, an increase in a blowing volume due to unintended air intake can be reduced, and an increase in power consumption in a blower can be avoided.

A battery system in a second aspect of the present invention may include an insulating sheet that is interposed between the battery stack and the binding bar on both sides of the battery stack. This insulating sheet may include through-holes that are open along the openings of the binding bar. Opening ends of the through-holes and opening ends of the openings may be close to each other, and the blocking parts of the separators may cover the opening ends of the through-holes.

In the configuration described above, opening ends of the through-holes provided in an insulating sheet are covered with blocking parts while inflow of air between a battery stack and a binding bar is effectively avoided, and this can securely suppress a situation where cooling capability is reduced due to inflow of air from gaps between the battery stack and the insulating sheet and between the binding bar and the insulating sheet.

In a battery system in a third aspect of the present invention, separator may include a plate and a peripheral wall. The plate may be interposed between the adjacent battery cells. The peripheral wall may be provided along an outer periphery of the plate, and protrude in a stacking direction of the battery cells. The peripheral wall may include side covers that are located outside each of both sides of the battery cell and are provided to be spaced apart from each other on upper and lower sides. The openings may be provided between the side covers that are located on the upper and lower sides and face each other, and the openings may cause each of both end openings of the cooling paths to communicate with an outside of the battery stack. The side cover may be provided with protrusions that are bent in a sectional view and serve as the blocking parts.

In the configuration described above, a battery cell can be coupled to a separator while being positioned, by using a peripheral wall provided in the separator. In addition, a protrusion that is bent in a sectional view is provided in both side covers of the peripheral wall, so that a blocking part is formed. With this, a blocking part that protrudes in an outward direction can be simply and easily formed.

A battery system in a fourth aspect of the present invention includes a battery stack, a pair of end plates, a pair of binding bars, a pair of insulating sheets, and a pair of ducts. The battery stack includes a plurality of battery cells and separators being stacked alternatively one by one and has openings on both sides. The plurality of battery cells has a prismatic shape, and is stacked in a thickness direction. The separator has insulation, and is interposed between the adjacent battery cells to form cooling paths between the adjacent battery cells. The openings communicate with a plurality of cooling paths. The pair of end plates are respectively disposed on both shorter sides of the battery stack. The pair of binding bars are disposed on both longer sides of the battery stack. Both ends of the pair of binding bars are fixed to the pair of end plates. Each of the pair of binding bars includes openings that are open so as to face the openings in such a way that cooling air can flow into the plurality of the cooling paths. An insulating sheet is interposed between the battery stack and the binding bar on a side of the battery stack, and includes through-holes that are open along the openings of the binding bar. A duct is disposed on both sides of the battery stack, covers the openings of the binding bar, and guides cooling air that cools down the battery cells. The battery system forcibly blows cooling air into the duct, and cools down the battery cells. The duct includes openings that are formed along the openings that are open in the binding bar. Opening ends of the openings and opening ends of the openings are close to each other. In the insulating sheet, blocking parts are formed at opening ends of the through-holes, and the blocking parts are bent in a sectional view to cover opening ends of the openings, opening ends of the openings, and opening ends of the openings.

In the configuration described above, facing opening ends of an opening of a duct and openings of a binding bar are covered with blocking parts of an insulating sheet, and therefore a situation can be suppressed where cooling capability is reduced due to inflow of air from gaps between the duct and the binding bar and between the insulating sheet and the binding bar, and highly efficient cooling capability can be achieved. In addition, by effectively avoiding inflow of air during forcible blowing, an increase in a blowing volume due to unintended air intake can be reduced, and an increase in power consumption in a blower can be avoided.

In a battery system in a fifth aspect of the present invention, blocking parts may be a T-shape in a sectional view. One shoulder of the T-shape may be inserted into the opening, and may cover an opening end of the opening and an opening end of the opening. The other shoulder of the T-shape may be inserted into the opening, and may cover an opening end of the opening.

In the configuration described above, opening ends of a separator, a binding bar, and a duct are efficiently blocked with an insulating sheet that is interposed between the separator and the binding bar, and a reduction in cooling capability due to inflow of air can be suppressed. In addition, an opening end of a through-hole that is open in the insulating sheet is bent in a T-shape in a sectional view, and a covered part is formed. Therefore, a shape of the covered part can be kept stable, and opening ends of openings, openings, and openings can be securely covered.

In a battery system in a sixth aspect of the present invention, the duct may have a bent part and an opening. The bent part may be formed by bending, inward, an opening of facing walls of a body that is formed in a groove shape. The opening may be formed between the bent parts facing each other. An interval (K) between ends of the bent parts facing each other of the opening may be nearly equal to an opening width (D) of the openings of the binding bar, and be smaller than a groove width (W) of the body.

In the configuration described above, an opening end of an opening is brought close to an opening end of an opening while an inner space of a duct is widened, and therefore inflow of air from a gap between the duct and a binding bar can be effectively avoided.

A battery system in a seventh aspect of the present invention further may include a blower that forcibly blows cooling air to the duct. From among the ducts that are respectively disposed on both sides of the battery stack, one of the ducts may serve as an inflow duct, and the other of the ducts may serve as an exhaust duct. In addition, the blower may be coupled to the exhaust duct.

Further, a vehicle that is equipped with a battery system in an eighth aspect of the present invention may include the battery system that has any of the configurations described above, a motor for traction that receives power from the battery system, a vehicle body mounted with the battery system and the motor, and wheels that are driven by the motor and cause the vehicle body to travel.

DESCRIPTION OF EMBODIMENTS

Figure 1:
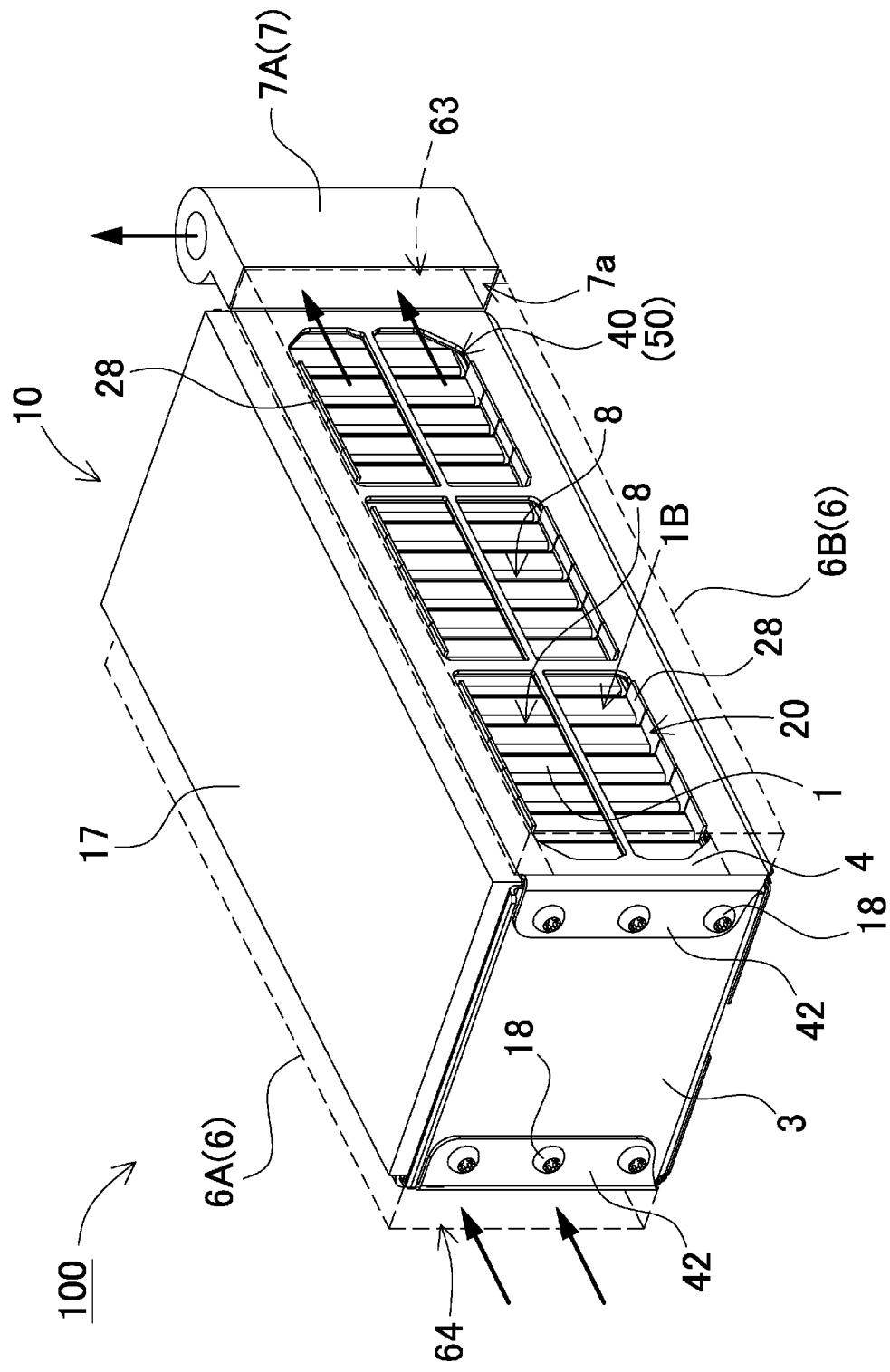
FIG. 1 is a perspective view of a battery system according to a first exemplary embodiment of the present invention.

Exemplary embodiments of the present invention are described below with reference to the FIGS. However, the exemplary embodiments described below are examples that allow a technical idea of the present invention to be embodied, and the present invention is not limited to the exemplary embodiments described below. In addition, the present description never limits members recited in the claims to members in the exemplary embodiments. In particular, it is not intended to limit the scope of the present invention to sizes, materials, and shapes of components, relative arrangement of the components, and the like that are described in the exemplary embodiments, unless otherwise specified. The sizes, materials, and shapes of the components and the relative arrangement of the components are mere explanation examples. Note that sizes of members and a positional relationship among the members, and the like that are illustrated in each of the drawings may be exaggerated for clear explanation. Further, in the description below, the same name or the same reference mark denotes the same member or the same type of member, and detailed description is appropriately omitted. Furthermore, with regard to respective elements that configure the present invention, a plurality of elements may be configured by the same member so that one member is used as the plurality of elements. In contrast, a function of one member can be achieved by being shared by a plurality of members.

First Exemplary Embodiment

A battery system according to a first exemplary embodiment of the present invention is illustrated in FIGS. 1 to 4. Battery system 100 illustrated in the FIGS. includes battery stack 10, a pair of end plates 3, a pair of binding bars 4, a pair of insulating sheets 5, and a pair of ducts 6. Battery stack 10 includes a plurality of battery cells 1 and separators 2 being stacked alternatively one by one and has openings 20 on both sides. The plurality of battery cells 1 has a prismatic shape, and is stacked in a thickness direction. Separator 2 has insulation, and is interposed between the adjacent battery cells 1 to form cooling paths 8 between the battery cells 1. Openings 20 communicate with a plurality of cooling paths 8. The pair of end plates 3 are respectively disposed on both shorter sides of battery stack 10. The pair of binding bars 4 are disposed on both longer sides of battery stack 10. Both ends of the pair of binding bars 4 are fixed to the pair of end plates 3. Each of the pair of binding bars 4 includes openings 40 that are open so as to face openings 20 in such a way that cooling air can flow into the plurality of cooling paths 8. Insulating sheet 5 is interposed between battery stack 10 and binding bar 4 on both longer sides of battery stack 10, and includes through-holes 50 that are open along openings 40 of binding bar 4. Duct 6 is disposed on both longer sides of battery stack 10, covers openings 40 of binding bar 4, and guides the cooling air that cools down battery cells 1. Further, battery system 100 includes blower 7 that forcibly blows the cooling air into cooling paths 8 of battery stack 10. Battery system 100 cools down battery cells 1 by forcibly blowing the cooling air to an exhaust duct 6 by using this blower 7.

(Battery Cell 1)

Battery cell 1 is a prismatic secondary battery in which width is greater than thickness and principal faces 1A opposite to each other are quadrangles. Battery cells 1 are stacked in a thickness direction to configure battery stack 10. Battery cell 1 is a nonaqueous electrolyte battery in which a battery case is made of metal, but this is not illustrated. Battery cell 1 serving as a nonaqueous electrolyte battery is a lithium ion secondary battery. The battery cell may be any other secondary battery such as a nickel metal hydride battery or a nickel-cadmium battery.

Figure 3:
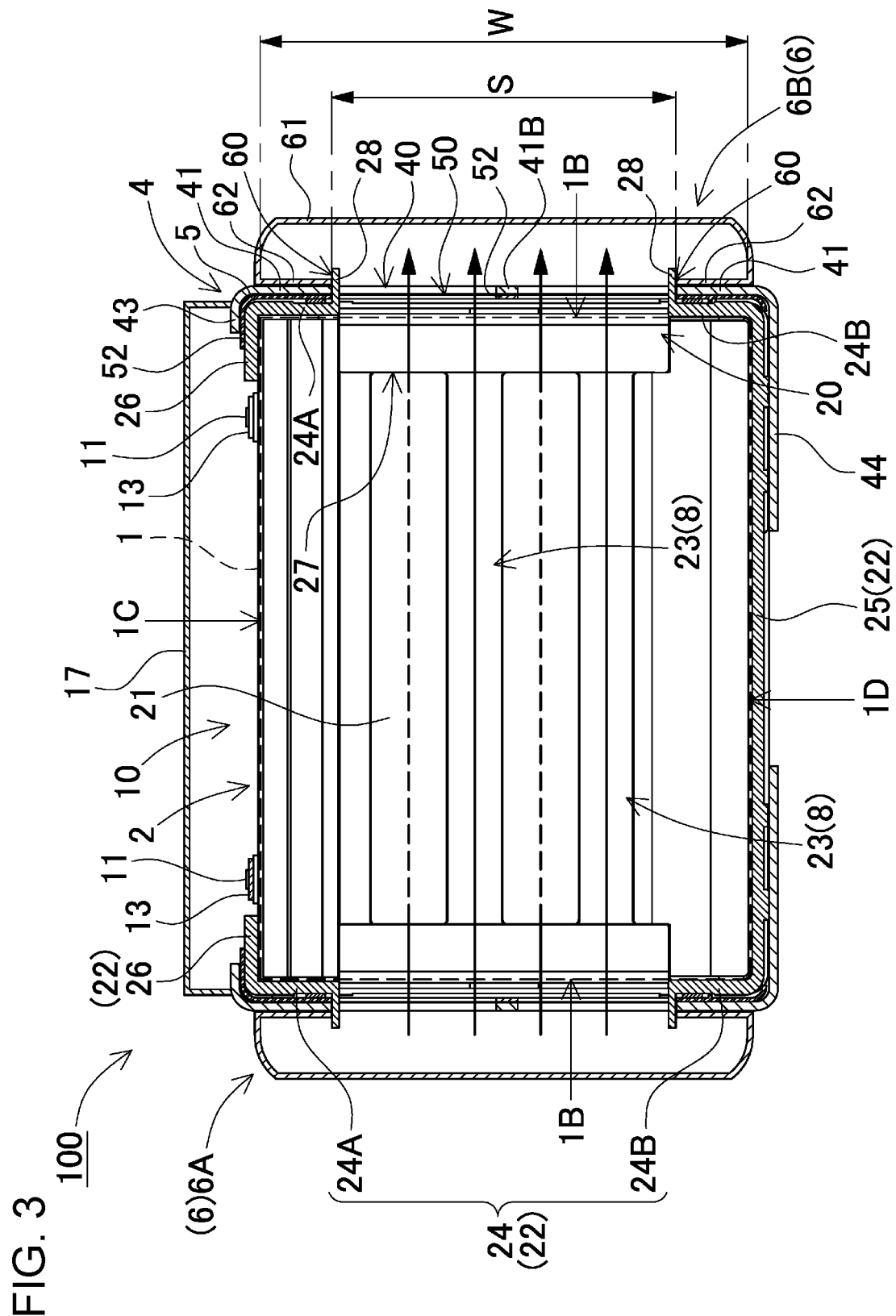
FIG. 3 is a vertical transverse sectional view of the battery system illustrated in FIG. 1.
Figure 4:
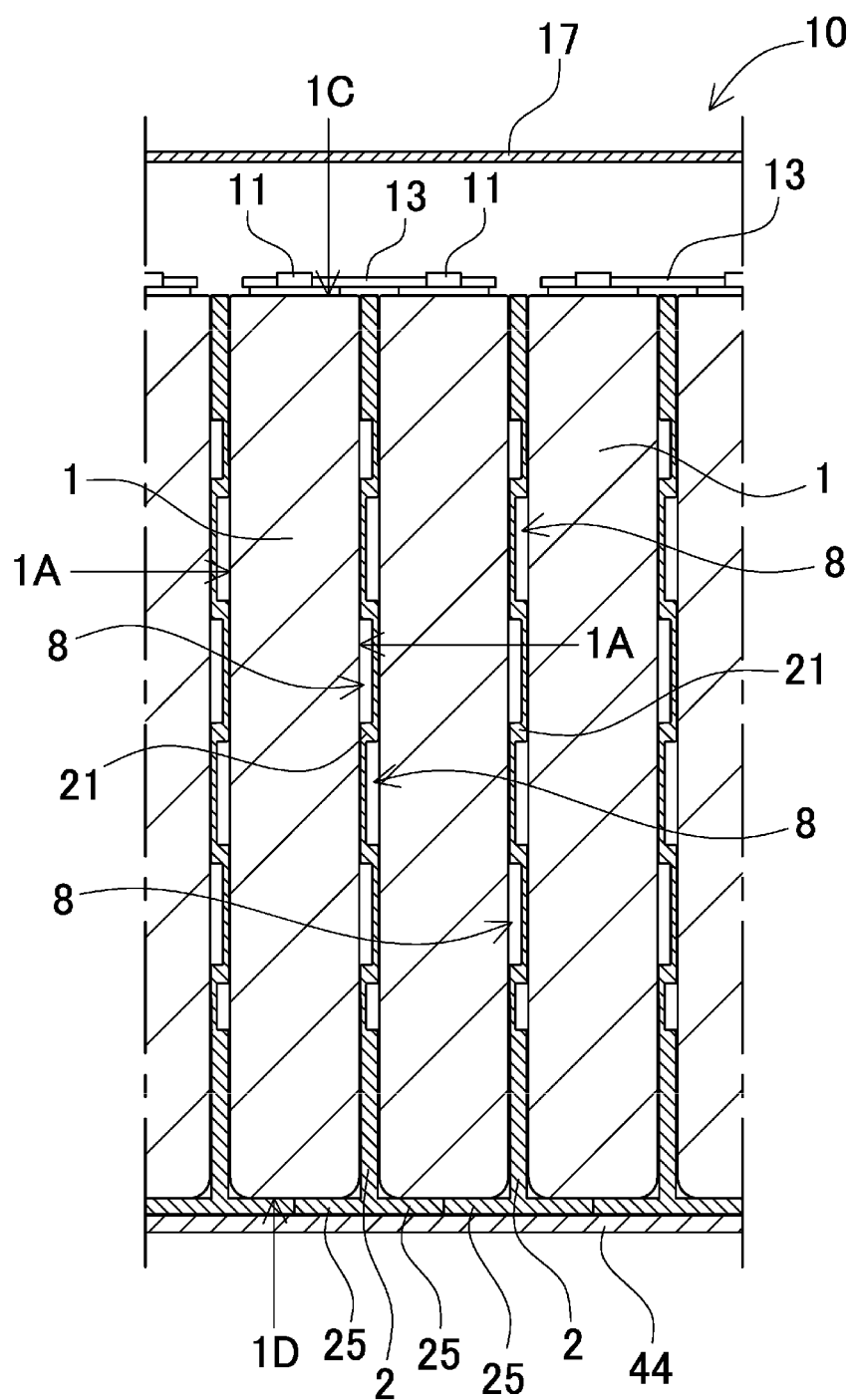
FIG. 4 is a vertical longitudinal sectional view of a battery stack illustrated in FIG. 2.

In battery cell 1, an electrode assembly is stored in a battery case that is made of metal and in which principal faces 1A opposite to each other have a quadrangular outer shape, and is filled with an electrolyte. The battery case made of metal can be manufactured by using aluminum or aluminum alloy. The battery case includes an exterior can that is obtained by pressing a metal sheet to form a cylinder with a bottom blocked, and a sealing plate that air tightly blocks an opening of this exterior can. In battery cell 1, positive and negative electrode terminals 11 are fixed at both predetermined positions on the sealing plate. The sealing plate is terminal face 1C, and a face on an opposite side of terminal face 1C, a lower face of battery cell 1 in FIGS. 3 and 4, is bottom face 1D. In battery stack 10, a plurality of battery cells 1 is stacked so as to have a form in which terminal faces 1C are located on the same plane.

In battery stack 10, bus bars 13 made of a metal sheet are fixed to positive and negative electrode terminals 11 of adjacent battery cells 1, and battery cells 1 are connected in series to each other by using bus bars 13, as illustrated in FIGS. 3 and 4. Note that, in the battery stack, battery cells can be connected in series and/or in parallel. In battery system 100 in which adjacent battery cells are connected in series to each other, an output voltage can be increased, and an output can be increased. By connecting adjacent battery cells in parallel, a current of charge and discharge can be increased. Battery stack 10 illustrated in FIG. 2 includes 18 battery cells 1, and these battery cells 1 are connected in series. However, the present invention does not limit a number of battery cells 1 that configure battery stack 10 and a connection state of battery cells 1.

(Separator 2)

Figure 2:
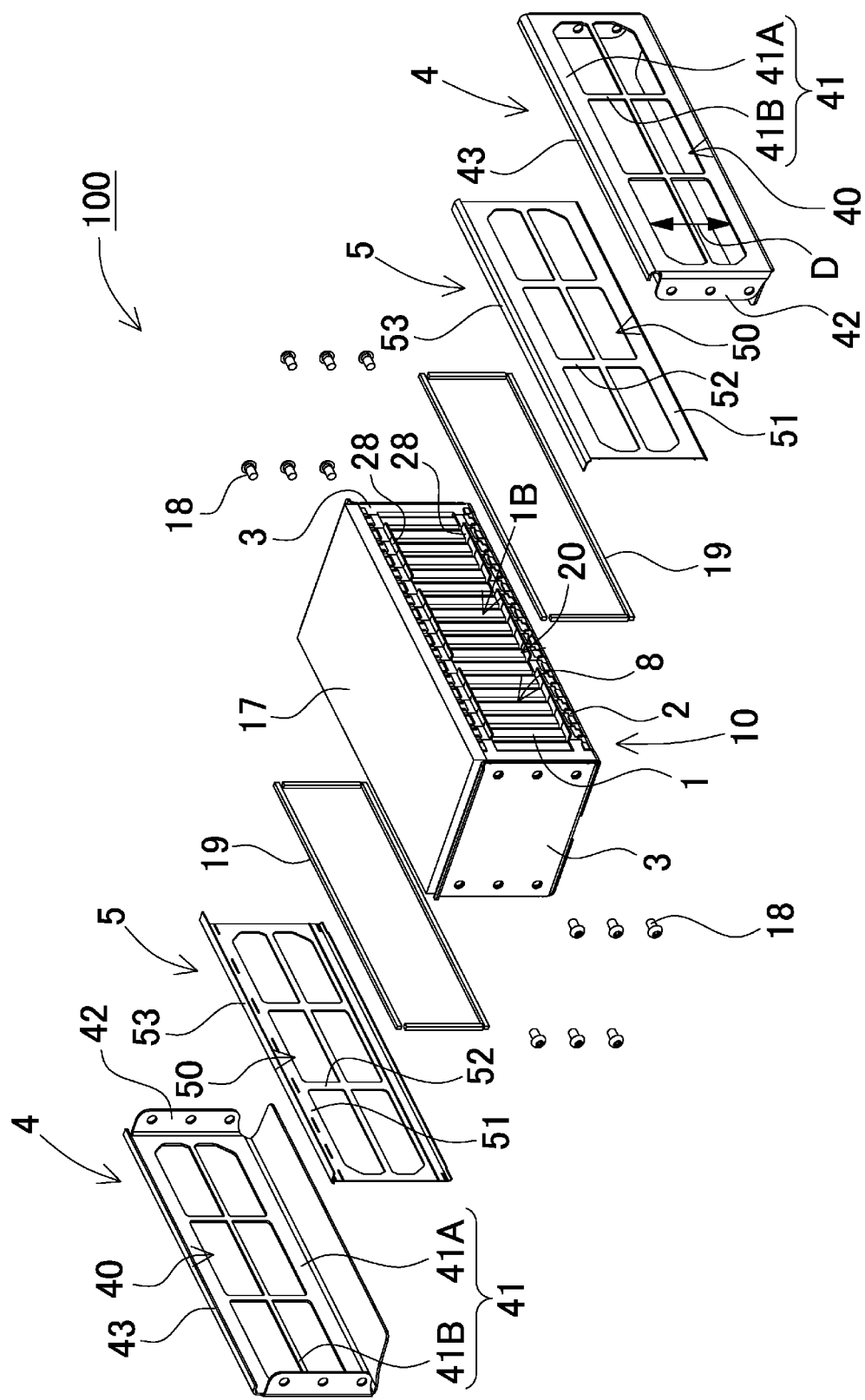
FIG. 2 is an exploded perspective view of the battery system illustrated in FIG. 1.

In battery stack 10 illustrated in FIGS. 2 to 4, separator 2 is between adjacent battery cells 1, and battery cells 1 and separators 2 are stacked alternatively one by one. Separator 2 is produced by molding plastic of an insulating material, and insulates battery cells 1 that are adjacent to each other. As described above, in each of battery cells 1 that are stacked while being insulated by separator 2, the exterior can may be made of metal such as aluminum. In separator 2 illustrated in FIGS. 3 to 5, plate 21 and peripheral wall 22 are integrally molded by using plastic. Plate 21 is disposed so as to be in contact with principal faces 1A of adjacent battery cells 1, and is between battery cells 1. Peripheral wall 22 is provided along an outer periphery of this plate 21, and protrudes in a stacking direction of battery cells 1. This separator 2 has a shape that allows battery cell 1 to be disposed inside peripheral wall 22 so that separator 2 is disposed in a fixed position, and separator 2 enables battery cells 1 to be stacked without misalignment.

Figure 5:
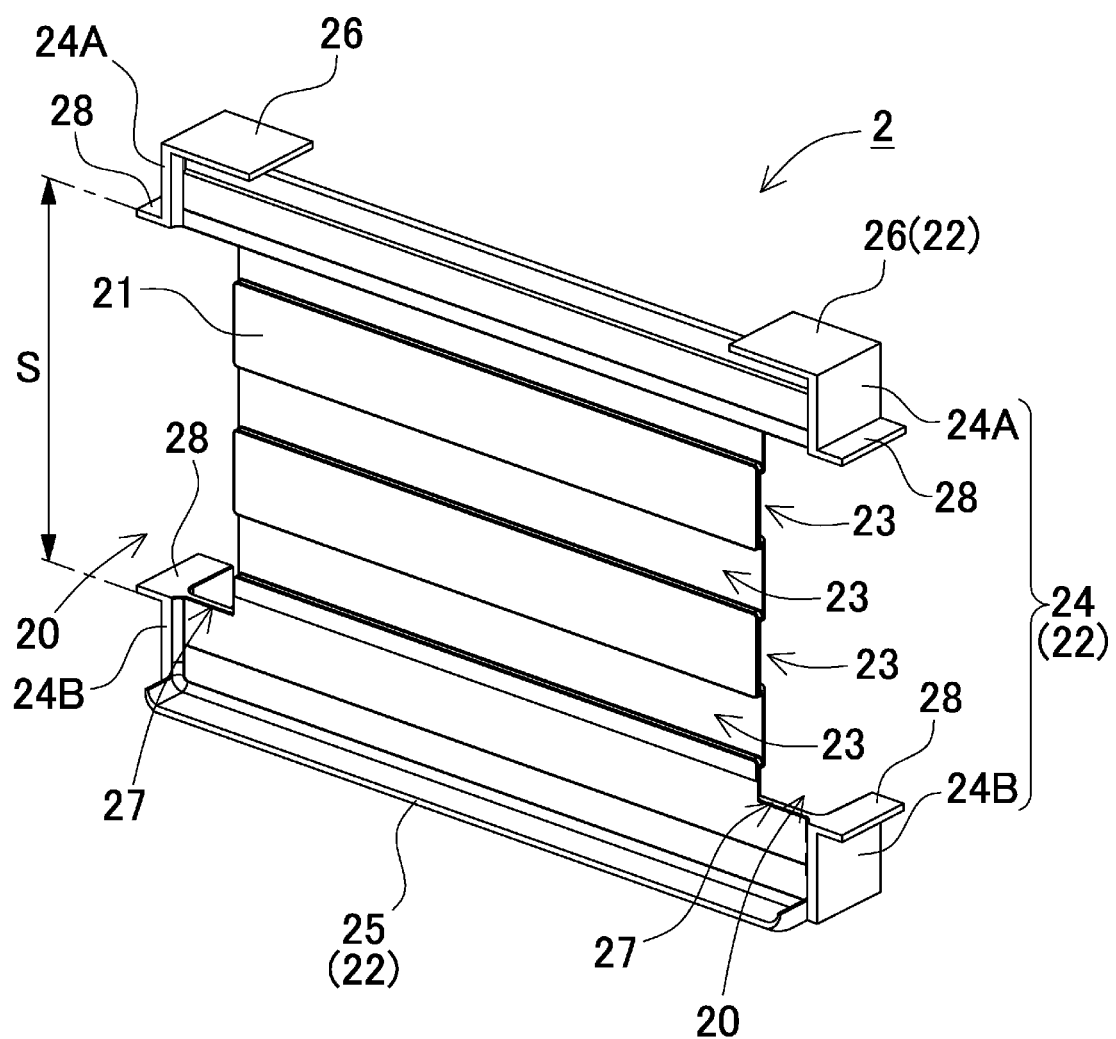
FIG. 5 is a perspective view of a separator.

Further, in separator 2, plate 21 that is between battery cells 1 is provided with cooling paths 8 that cooling air passes through, in order to effectively cool down battery cells 1. Plate 21 of separator 2 illustrated in FIGS. 4 and 5 is molded to have a zigzag shape in a sectional view. These cooling paths 8 that are parallel to each other are provided between plate 21 and principal face 1A serving as a surface of facing battery cell 1. Cooling paths 8 are open on both sides of battery stack 10. Cooling air supplied from one side is exhausted to the other side, so that battery cells 1 are cooled down.

This separator 2 is provided with a plurality of grooves 23, and cooling paths 8 are provided between separator 2 and the adjacent battery cells 1. In illustrated separator 2, the grooves 23 are provided in parallel to each other at predetermined intervals.

In illustrated plate 21, grooves 23 are provided on both sides, and a plurality of cooling paths is provided between battery cells 1 adjacent to each other and separator 2. In this structure, battery cells 1 stacked on both faces of plate 21 can be effectively cooled down by using cooling air that is blown to cooling paths 8 that are formed on both faces of plate 21. The separator can be provided with grooves on only one face, and cooling paths can be provided between a battery cell and the separator.

Further, in separator 2 illustrated in FIGS. 3 to 5, cutout recesses 27 are provided by partially removing portions that are both thinner side ends of plate 21 and face openings 20 that are open on both sides of battery stack 10. This separator 2 causes cooling air that flows in from openings 20 on one side of battery stack 10 to dividedly flow from cutout recess 27 to a plurality of cooling paths 8 that is provided on both faces of plate 21, and brings the cooling air into be in contact with surfaces of battery cells 1 so as to cool down battery cells 1. Separator 2 causes cooling air that has passed through cooling paths 8 on both faces of plate 21 to be merged in cutout recess 27 on an opposite side, and exhausts the cooling air from openings 20 on the other side of battery stack 10. Further, in this separator 2, cutout recess 27 is provided on both thinner sides of plate 21, and this can prevent both faces of the exterior can of battery cell 1 from being strongly pressed by separator 2.

Furthermore, in separator 2 of FIGS. 3 and 5, an inner shape of peripheral wall 22 is almost the same as an outer shape of battery cell 1. Battery cell 1 is put inside peripheral wall 22, and separator 2 is disposed in a fixed position with respect to battery cell 1. Peripheral wall 22 includes side covers 24, bottom cover 25, and upper covers 26. Side covers 24 are located outside each of both side faces 1B of battery cell 1, and partially covers side faces 1B of battery cell 1. Bottom cover 25 is located outside bottom face 1D of battery cell 1, and covers an entirety of bottom face 1D of battery cell 1. Upper covers 26 are located on an upper side of battery cell 1, and partially cover terminal face 1C of battery cell 1.

Side covers 24, bottom cover 25, and upper covers 26 are provided on both faces of separator 2 so as to protrude in a stacking direction of battery cells 1, as illustrated in FIGS. 4 and 5. Battery cell 1 is disposed among side covers 24 on both sides, bottom cover 25, and upper covers 26, and separators 2 hold battery cells 1 in a fixed position.

Side covers 24 are provided outside each of both sides 1B of battery cell 1 so as to be separated on upper and lower sides. Side cover 24 illustrated in FIGS. 3 and 5 includes upper covers 24A and lower covers 24B. Upper covers 24A cover upper ends of side 1B of battery cell 1. Lower covers 24B cover lower ends of side 1B of battery cell 1. Upper ends of upper covers 24A are coupled to upper covers 26 that cover an upper face of battery cell 1. Upper covers 26 and upper covers 24A are formed as shown in FIG. 5, and cover both upper-end corners of battery cell 1. Lower ends of lower covers 24B are coupled to both ends of bottom cover 25 that covers bottom face 1D of battery cell 1. Bottom cover 25 and lower covers 24B on both sides are formed in a U-shape with an upper open, and cover a bottom of battery cell 1.

Further, in side covers 24, openings 20 are provided between upper covers 24A and lower covers 24B that face each other. Openings 20 allow openings at both ends of cooling paths 8 to communicate with the outside on both sides of battery stack 10. Separator 2 illustrated in FIGS. 3 and 5 has a structure in which openings 20 are provided between upper covers 24A and lower covers 24B that are spaced apart from each other and side face 1B of battery cell 1 is partially exposed from the openings 20. In a state where a plurality of battery cells 1 and separators 2 are stacked alternatively one by one while separator 2 is interposed between battery cells 1, as illustrated in FIG. 2, side covers 24 of separators 2 adjacent to each other are coupled at facing edges, and the outsides are disposed on the same plane. In addition, openings 20 of adjacent separators 2 are coupled, and openings 20 that communicate with a plurality of cooling paths 8 are formed on both sides of battery stack 10.

(Blocking Part 28)

Figure 6:
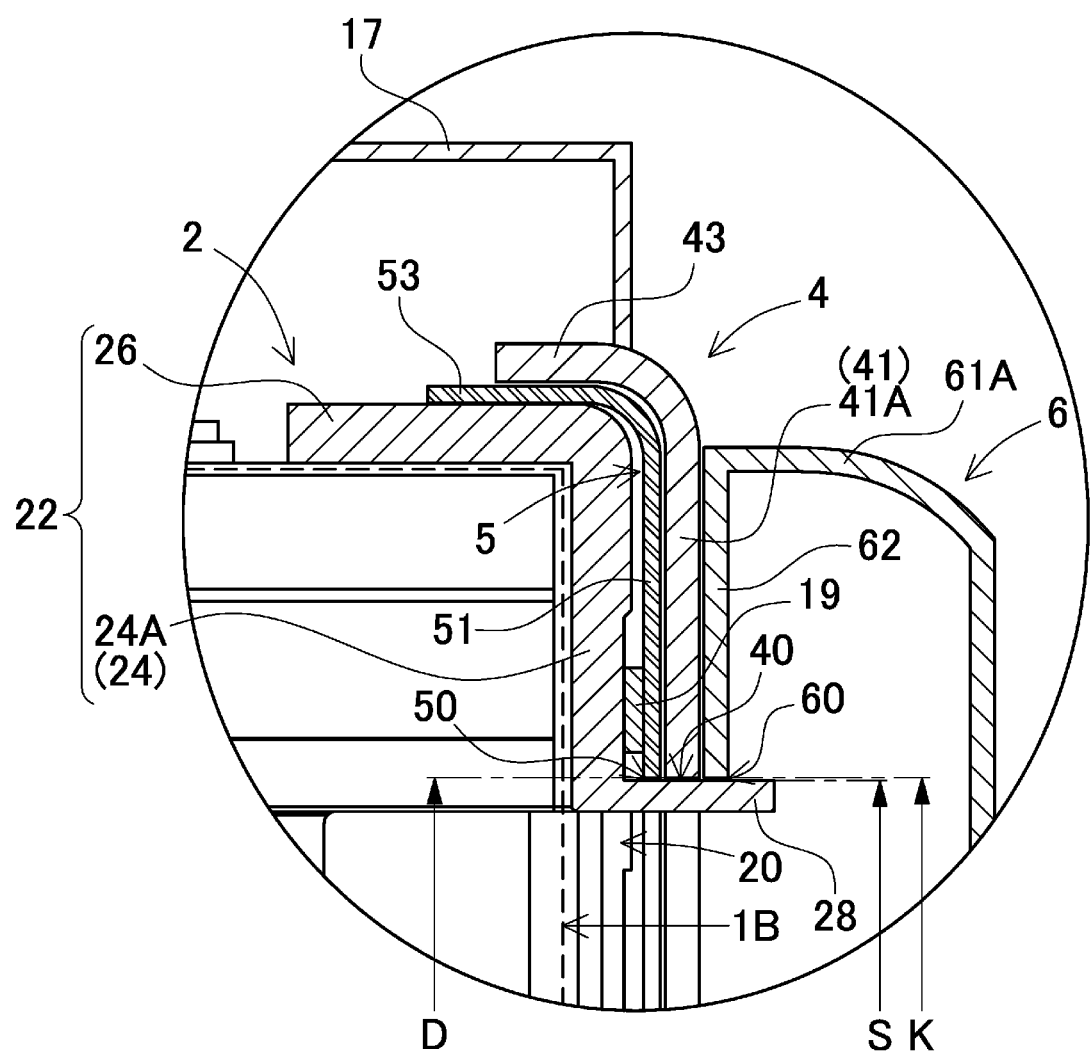
FIG. 6 is an enlarged sectional view of a principal portion of the battery system illustrated in FIG. 3.

Further, in separator 2 illustrated in FIGS. 3, 5, and 6, blocking part 28 that protrudes in a direction of each of both sides of battery stack 10 is formed along opening 20 of side cover 24. Illustrated separator 2 is provided with blocking part 28 that has a horizontal form and protrudes in an outward direction from an edge on a side of opening 20 of each of side covers 24. In illustrated side cover 24, a protrusion that is bent in an L-shape in a sectional view is integrally molded, so that blocking part 28 is formed. Blocking part 28 that protrudes outward from side cover 24 is disposed so as to be inserted into openings 40 of binding bar 4 that is disposed on each of both sides of battery stack 10 and gets inside of duct 5 that is disposed outside binding bar 4, as illustrated in FIGS. 3 and 6.

Here, in binding bar 4, openings 40 are open that face openings 20 of battery stack 10, as illustrated in FIG. 3. Further, duct 6 that is disposed outside binding bar 4 and covers the openings 40 are provided with an opening 60. The opening 60 is formed along openings 40 that are open in binding bar 4. Furthermore, duct 6 is disposed in a state where an opening end of opening 60 and opening ends of openings 40 are close to each other. Blocking part 28 that protrudes from separator 2 has a structure to pass through openings 40 of binding bar 4, be inserted into opening 60 of duct 6, and cover the opening ends of openings 40 and the opening end of opening 60, as illustrated in FIGS. 3 and 6. In illustrated blocking part 28, a face that faces the opening ends of openings 40 and the opening end of opening 60 has a planar shape. Accordingly, binding bar 4 and duct 6 that are illustrated are disposed to be close to each other in such a way that an inner face of openings 40 and an inner face of opening 60 that face blocking parts 28 are located on the same plane. A facing face of blocking part 28 blocks the inner faces of openings 40 and opening 60 in a close contact state. As described above, blocking part 28 covers the inner face of opening 60 of duct 6 and openings 40 of binding bar 4, and therefore gaps between duct 6 and binding bar 4 and between separator 2 and binding bar 4 are blocked. This can effectively suppress inflow of air from the gaps.

It is preferable that blocking part 28 have a protrusion length enough to pass through opening 40 and opening 60 and be inserted into an inside of duct 6. In this structure, the gap between duct 6 and binding bar 4 can be securely blocked with blocking part 28 that is inserted into opening 60. Blocking part 28 does not always need to be inserted into the inside of duct 6, and can have at least a length enough to block the opening end of opening 60. Further, it is preferable that blocking part 28 be disposed so as to be in contact air tightly with the inner faces of openings 40 and opening 60. In particular, a structure in which blocking part 28 is disposed so as to be in contact air tightly with the inner face of opening 60 can effectively suppress in flow of air from the gaps between duct 6 and binding bar 4 and between separator 2 and binding bar 4. In addition, a structure in which blocking part 28 is disposed so as to be in contact air tightly with the inner faces of openings 40 can effectively suppress in flow of air from the gaps between separator 2 and binding bar 4. A slight gap may be generated between blocking part 28 and the inner faces of openings 40 and opening 60. This is because, in battery system 100 illustrated in FIG. 6, a number of points of inflow of air can be reduced to one by blocking gaps inside and outside binding bar 4 with blocking parts 28, while, in a conventional battery system illustrated in FIG. 13, inflow of air occurs in a plurality of points, inside and outside a binding bar. Therefore, even if a slight gap is generated between blocking part 28 and the inner face of opening 60 and air slightly flows in this gap, an amount of air can be reduced by limiting inflow of air from a gap between separator 4 and duct 6.

In separator 2 illustrated in FIGS. 3 and 5, blocking part 28 is provided in both side covers 24 that are formed so as to be spaced apart from each other on upper and lower sides. Stated another way, in illustrated separator 2, each of lower ends of upper covers 24A and upper ends of lower covers 24B is caused to protrude outward, so that blocking part 28 is provided. Blocking part 28 that protrudes from upper cover 24A covers an upper opening end of opening 40 and an upper opening end of opening 60, and suppresses inflow of air from upper sides of openings 40 and opening 60, as illustrated in the enlarged sectional view of FIG. 6. In addition, blocking part 28 that protrudes from lower cover 24B covers a lower opening end of opening 40 and a lower opening end of opening 60, and suppresses inflow of air from lower sides of openings 40 and opening 60. As described above, a structure in which blocking part 28 is provided in both upper and lower side covers 24 has a configuration by which inflow of air from upward and downward directions of openings 40 and opening 60 can be effectively prevented.

In the battery system, the blocking part can only be provided in the upper cover of the side covers that are formed so as to be spaced apart from each other on upper and lower sides, but this is not illustrated. In a battery stack for which an upper face is terminal faces of stacked battery cells, positive and negative electrode terminals are disposed at both predetermined positions on a sealing plate as shown in FIG.3 serving as each of the terminal faces, and these need to be coupled by using a bus bar. Therefore, the battery stack has a structure in which an upper side is open. In contrast, a bottom side of the battery system is blocked with a plate on which the battery system is placed. Therefore, in the battery system, the upper side is more difficult to air tightly block than the bottom side, and inflow of air occurs more easily on the upper side. Accordingly, with the battery system provided with a blocking part at least in the upper cover, inflow of air from the upper side is suppressed. This can effectively prevent inflow of air in a simple structure.

Bottom cover 25 is coupled to a lower end of plate 21, and is provided so as to protrude in a stacking direction of battery cells 1, namely, a horizontal direction. Bottom cover 25 covers an entirety of bottom face 1D of facing battery cell 1 in a state where battery cells 1 and separators 2 are stacked alternatively one by one. Battery cells 1 are stacked on both faces of plate 21 of separator 2 of FIG. 4. Therefore, bottom cover 25 that protrudes from a lower edge of plate 21 to both faces is provided by being integrally molded. Separator 2 illustrated in FIG. 4 includes bottom cover 25 that protrudes to one face of plate 21 and bottom cover 25 that protrudes to the other face of plate 21. On a bottom of battery cells 1, longer edges of bottom covers 25 facing each other are brought close to each other to block the bottom of battery cells 1. In the separator, bottom covers facing each other can be stacked on the bottom of the battery cells. This structure can improve airtightness on a bottom of a battery stack.

(End Plate 3)

End plates 3 are respectively disposed at both ends of battery stack 10. End plates 3 are coupled to binding bars 4, press battery stack 10 from the both shorter sides, and fix respective battery cells 1 of battery stack 10 at a predetermined fastening pressure. End plate 3 has an outer shape that is almost equal to or slightly larger than an outer shape of battery cell 1. End plate 3 has a quadrangular plate shape that is not deformed by being coupled to binding bars 4 on the both shorter sides and fixing battery stack 10 in a pressurized state. This end plate 3 is coupled to binding bars 4 on both sides, comes into be in contact air tightly with a surface of battery cell 1, and fixes battery cell 1 at a uniform pressure in a pressurized state. In the battery system, end plates 3 are respectively disposed at the both shorter sides of battery stack 10, end plates 3 at the both shorter sides are pressed by a pressing machine (not illustrated) to hold battery cells 1 in a pressurized state in a stacking direction. In this state, binding bars 4 are fixed to end plates 3, and battery stack 10 is held and fixed at a predetermined fastening pressure. After end plates 3 are coupled to binding bars 4, a pressing state of the pressing machine is released.

(Binding Bar 4)

Binding bars 4 are respectively disposed on both sides of battery stack 10, are coupled to end plates 3 at both shorter sides of battery stack 10, and fix a plurality of battery cells 1 in a pressurized state in the stacking direction, as illustrated in FIGS. 1 to 3. Binding bar 4 is produced by pressing a metal sheet. This binding bar 4 includes side plate 41 that is disposed on a side of battery stack 10, and fixing parts 42 that are located at both ends of this side plate 41 and are disposed on outside ends of end plates 3. Fixing part 42 is fixed to each of both sides of end plate 3 with setscrews 18.

Further, binding bar 4 has a structure in which openings 40 are provided on an inside excluding an outer peripheral edge of side plate 41 so that cooling air can be blown to an inside of battery stack 10. Illustrated openings 40 are open so as to face openings 20 that are open on each of both sides of battery stack 10. In illustrated binding bar 4, peripheral edge plate 41A having a quadrangular shape is provided at the outer peripheral edge of side plate 41, and openings 40 are formed inside peripheral edge plate 41A. In side plate 41 illustrated in FIGS. 1 and 2, quadrangular peripheral edge plate 41A is coupled vertically and horizontally to coupling bar 41B. Openings 40 that have been divided into a plurality of sections are provided inside peripheral edge plate 41A while peripheral edge plate 41A is reinforced with coupling bar 41B. In illustrated binding bar 4, openings 40 are provided in such a way that outermost edges that connect opening ends that are located in an outermost periphery in a plurality of openings 40 obtained by vertically and horizontally sectioning opening 40 is a shape along an opening end of openings 20 that are open on a side of battery stack 10. Stated another way, opening 40 is open along the opening end of opening 20 that is disposed on the side of battery stack 10. In particular, opening 40 is disposed in such a way that, from among opening ends that are located in an outermost periphery of openings 40, an upper opening end and a lower opening end are close to upper and lower opening ends of openings 20. These upper opening ends and lower opening ends of openings 40 are covered with blocking parts 28 that protrude from side plates 24 of separators 2.

Illustrated binding bar 4 is sectioned into a plurality of openings 40 by using coupling bar 41B that is coupled vertically and horizontally to peripheral edge plate 41A. Therefore, in separators 2 that are disposed in positions that face these coupling bars 41B, blocking part 28 that protrudes from side cover 24 is not provided, and the outside of side cover 24 is a flat face. Stated another way, in separator 2, a protrusion is only provided in side cover 24 that is located in opening 40 and does not face coupling bar 41B, so that blocking part 28 is formed. Note that the binding bar does not always need to be provided with the coupling bar. A binding bar without the coupling bar can be covered with the blocking parts over an entirety of upper and lower opening ends of openings that are open in a side plate.

Further, binding bar 4 includes upper side locking part 43 and bottom side locking part 44, as illustrated in FIGS. 3 and 6. Upper side locking part 43 is disposed on an upper face of battery stack 10. Bottom side locking part 44 is located on a bottom face of battery stack 10. In illustrated binding bar 4, an upper end of side plate 41 is bent inward at a right angle, so that upper side locking part 43 is provided. Upper side locking part 43 includes a horizontal part that covers the upper face of battery stack 10, an inner face of this horizontal part has a flat shape, and terminal faces 1C of respective battery cells 1 are disposed in the same plane. In battery system 100 of FIG. 3, upper cover 26 of separator 2 is disposed on terminal face 1C of battery cell 1, as illustrated in FIG. 6. Accordingly, this battery system 100 is disposed in such a way that upper cover 26 of separator 2 is between terminal face 1C and upper side locking part 43. Terminal faces 1C of battery cells 1 are pressed against upper side locking part 43 with upper covers 26 of separators 2, and are disposed in the same plane.

Further, in illustrated binding bar 4, a lower end of side plate 41 is bent inward at a right angle, so that bottom side locking part 44 is provided. Bottom side locking part 44 has a greater protrusion length from a lower end of side plate 41, and covers the bottom face of battery stack 10 over a wide area. This can effectively prevent air from a bottom side of battery stack 10 to an inside of binding bar 4. In illustrated binding bar 4, a protrusion length of bottom side locking part 44 is about ⅓ of a width of battery stack 10. The protrusion length of bottom side locking part 44 can be ⅒ to ½ of the width of battery stack 10.

(Insulating Sheet 5)

Insulating sheet 5 is a sheet material that is interposed between battery stack 10 and binding bar 4, and insulating sheet 5 is obtained by molding a resin material in a predetermined shape. Insulating sheet 5 can be produced, for example, by molding thermoplastic resin into a sheet having a predetermined shape by using a method such as injection molding. A material having an excellent heat resistance is suitable for thermoplastic resin from which insulating sheet 5 is manufactured, and polypropylene can be used. In particular, by adding filler such as talc to polypropylene, insulating sheet 5 can be manufactured at a lower cost, and heat resistance and moisture resistance can be improved. Resin other than polypropylene can also be used as thermoplastic resin, and various materials can be used as filler to be added to resin according to purposes.

Insulating sheet 5 illustrated in FIGS. 2 and 3 includes flat face 51 that is between binding bar 4 and battery stack 10. In a section inside this flat face 51, through-holes 50 are open along openings 20 of battery stack 10. Flat face 51 of insulating sheet 5 is molded in a quadrangular frame shape along the inside of peripheral edge plate 41A, and is provided vertically and horizontally with intermediate coupling part 52 along the inside of coupling bar 41B that is formed in side plate 41. Stated another way, in insulating sheet 5 of FIG. 2, through-holes 50 are open along the opening ends of openings 40 that have been divided into a plurality of sections of binding bar 4. Through-holes 50 that have been divided into a plurality of sections are disposed in such a way that, from among opening edges that are located in an outermost periphery, upper opening ends and lower opening ends are close to the upper and lower opening ends of openings 20. An upper opening end and a lower opening end of this through-hole 50 are covered with blocking parts 28 that protrude from side plates 24 of separators 2. In insulating sheet 5 illustrated in FIG. 2, through-holes 50 are divided into a plurality of sections along openings 40 of binding bar 4. However, in an insulating sheet, a through-hole can be opened without an intermediate coupling part.

Further, in insulating sheet 5 illustrated in FIGS. 3 and 6, stacked part 53 is molded and provided at an upper end. Stacked part 53 is disposed between upper side locking part 43 of binding bar 4 and upper cover 26 of separator 2. Stacked part 53 is molded in a shape that is bent along an inside of upper side locking part 43 in such a way that one end is coupled to flat face 51. Stacked part 53 is extended to the inside of upper side locking part 43 in such a way that upper side locking part 43 of binding bar 4 and upper covers 26 can be disposed in a non-contact state. In addition, stacked part 53 is molded so as to have a total length that can cover an entirety of upper side locking part 43. This insulating sheet 5 is disposed in a fixed position of the inside of binding bar 4 in such a way that an opening edge of through-hole 50 is disposed along an opening edge of opening 40 of binding bar 4. Stated another way, in insulating sheet 5 coupled to binding bar 4, flat face 51 is disposed on the inside of peripheral edge plate 41A of binding bar 4, intermediate coupling part 52 is disposed along the inside of coupling bar 51B, and stacked part 53 is disposed on the inside of upper locking part 43, so that insulating sheet 5 is disposed in a fixed position of binding bar 4.

As described above, in a structure in which insulating sheet 5 is interposed between binding bar 4 and battery stack 10, inflow of air between battery stack 10 and binding bar 4 can be effectively prevented while binding bar 4 made of metal is insulated from battery stack 10. In particular, a section from side covers 24 of separators 2 via through-holes 50 of insulating sheet 5 to the inside of openings 40 of binding bar 4 is covered with blocking parts 28, and this can securely suppress inflow of air from gaps between battery stack 10 and insulating sheet 5 and between binding bar 4 and insulating sheet 5. Note that an insulating sheet can be omitted from a battery system, but this is not illustrated.

Further, in battery system 100 illustrated in FIG. 2, cushioning material 19 is between insulating sheet 5 and separator 2. This cushioning material 19 is obtained, for example, by cutting a plastic open cell foaming sheet body into a predetermined shape. In illustrated cushioning material 19, cut pieces having a rectangular shape are coupled in a quadrangular frame shape along through-holes 50, and are disposed on the inside of flat face 51 of insulating sheet 5. This cushioning material 19 is between insulating sheet 5 and separators 2 in a pressurized state, is elastically deformed, and blocks a gap between insulating sheet 5 and separator 2 in a compressed state. As described above, in a structure in which cushioning material 19 is between insulating sheet 5 and separator2, the gap between insulating sheet 5 and separator2 can be effectively blocked, and inflow of air from the gap can be reduced. This cushioning material can be omitted.

Further, in battery system 100 illustrated in FIGS. 1 to 4, an upper side of battery stack 10 is covered with cover case 17. This cover case 17 is molded of plastic, and covers the upper side of battery stack 10. As described above, the upper side of battery stack 10 is covered with cover case 17, and therefore inflow of air from the upper side of battery stack 10, namely, from a side of terminal faces 1C of battery cells 1, can be suppressed. In addition, cover case 17 illustrated in FIG. 3 covers an edge of upper side locking part 43 of binding bar 4 and a boundary between upper side locking part 43 and separator 2. In this structure, inflow of air from a boundary between upper side locking part 43 and separator 2 can be reduced.

(Duct 6)

Duct 6 is disposed on both sides of battery stack 10, and duct 6 causes cooling air that is forcibly blown to the inside to be blown from openings 20 of battery stack 10 to cooling paths8. Duct 6 is formed in a hollow shape so as to cover openings 40 of binding bar 4. In the duct 6, opening 60 is open in order to blow cooling air to battery stack 10. Opening 60 is coupled to openings 20 and openings 40 that communicate with cooling paths 8. Duct 6 illustrated in FIG. 3 is formed in a roughly C-shape in a transverse sectional view by bending, inward, opening sides of facing walls 61A of body 61 that is formed in a U-shape and has a groove shape. Upper and lower bent parts 62 are disposed so as to be in contact air tightly with the outside of binding bar 4. In this duct 6, an opening that is formed between edges of upper and lower bent parts 62 facing each other is opening 60.

In duct 6 illustrated in FIGS. 3 and 6, groove width (W) of body 61 is greater than opening width (D) of openings 40 of binding bar 4, and interval (K) between edges of bent parts 62 facing each other is smaller than groove width (W) of body 61. Further, in duct 6, the edges of upper and lower bent parts 62 facing each other are extended to the opening ends of openings 40 of binding bar 4, and the opening ends of openings 60 and the opening ends of openings 40 are brought close to each other. It is preferable that interval (K) between the edges of bent parts 62 facing each other be nearly equal to or slightly smaller than opening width (D) of openings 40. In particular, interval (K) between the edges of bent parts 62 is nearly equal to outer width (5) between upper and lower blocking parts 28 that protrude from separator 2. With this, an opening edge of opening 60 is blocked with facing edges of blocking parts 28 in a contact state air tightly in a state where the opening ends of openings 40 and the opening ends of openings 60 are covered with blocking parts 28, and inflow of air from the gap can be effectively prevented. By covering the inside of opening 60 of duct 6 and openings 40 of binding bar 4 with blocking parts 28, gaps between duct 6 and binding bar 4 and between separator 2 and binding bar 4 are blocked, and inflow of air from the gaps can be effectively suppressed.

As described above, duct 6 in which groove width (W) of body 61 is greater than opening width (D) of openings 40 of binding bar 4 has a configuration of widening a space in the duct. In addition, this duct 6 is formed in a roughly C-shape in a transverse sectional view, and the edges of upper and lower bent parts 62 are extended toward openings 40 of binding bar 4. This enables a gap between duct 6 and blocking parts 28 to be securely blocked. Therefore, outsides of bent parts 62 are caused to abut onto the outside of binding bar 4 in a contact state air tightly, and inflow of air between binding bar 4 and duct 6 can be reduced.

Figure 7:
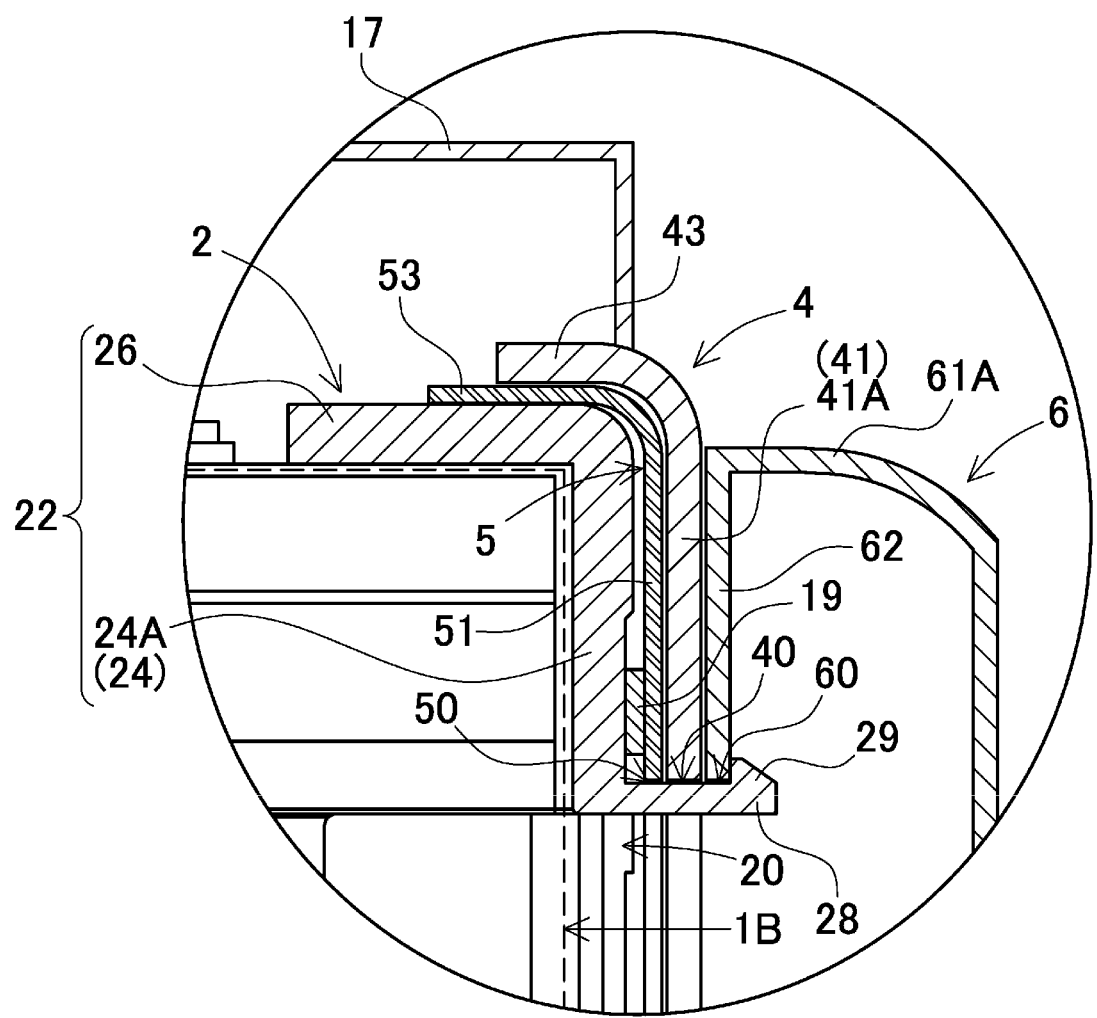
FIG. 7 is a sectional view illustrating another example of a separator in a battery system according to another exemplary embodiment of the present invention.

Further, in a structure in which bent parts 62 of duct 6 are extended to blocking parts 28, hook 29 can be provided at an edge of blocking part 28 of separator 2, as illustrated in FIG. 7. In this separator 2, protruding blocking part 28 is inserted into opening 40 and opening 60 while being elastically deformed, and hook 29 at an edge is disposed so as to be locked by an opening end of opening 60. Therefore, a gap between blocking part 28 and opening 60 can be securely blocked by using hook 29 in a state where blocking part 28 is disposed in a fixed position of duct 6.

Figure 8:
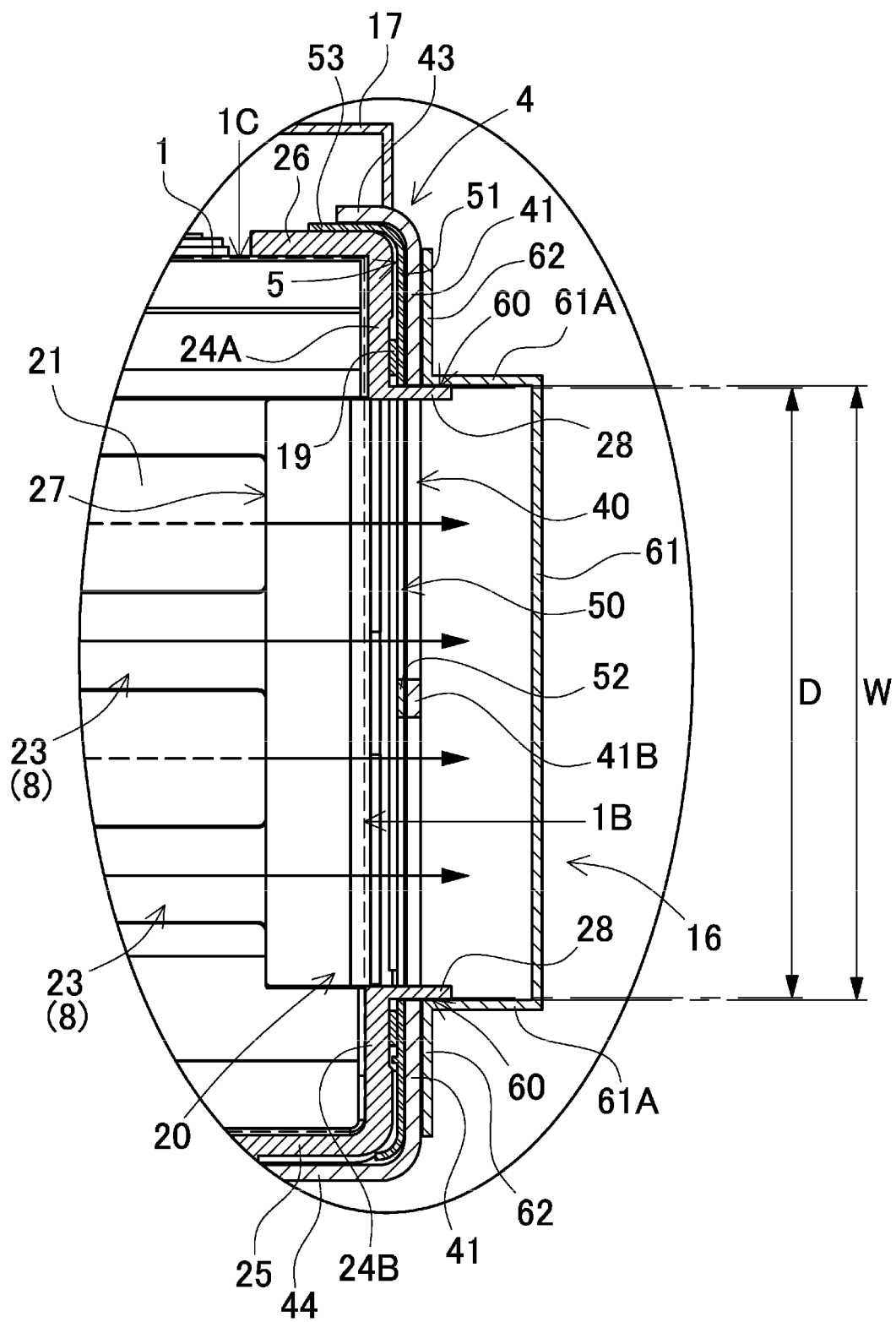
FIG. 8 is a sectional view illustrating another example of a duct in a battery system according to another exemplary embodiment of the present invention.

Further, a duct can have a shape illustrated in FIG. 8. In duct 16 illustrated in FIG. 8, a groove width (W) of body 61 that is formed in a U-shape and has a groove shape is almost equal to opening width (D) of opening 40 of binding bar 4. In addition, edges of upper and lower facing walls 61A are bent outward, and bent parts 62 are provided. Upper and lower bent parts 62 are disposed so as to contact air tightly with the outside of binding bar 4. In this duct 6, an opening of body 61 is opening 60, and this opening 60 is covered in a state where facing edges of blocking parts 28 that are inserted into opening 60 are in contact air tightly with an inner peripheral face of opening 60. In this structure, blocking parts 28 that cover opening 60 are brought into contact air tightly with the inner peripheral face of opening 60 over a wide area, and this enables a gap to be blocked more effectively.

Figure 9:
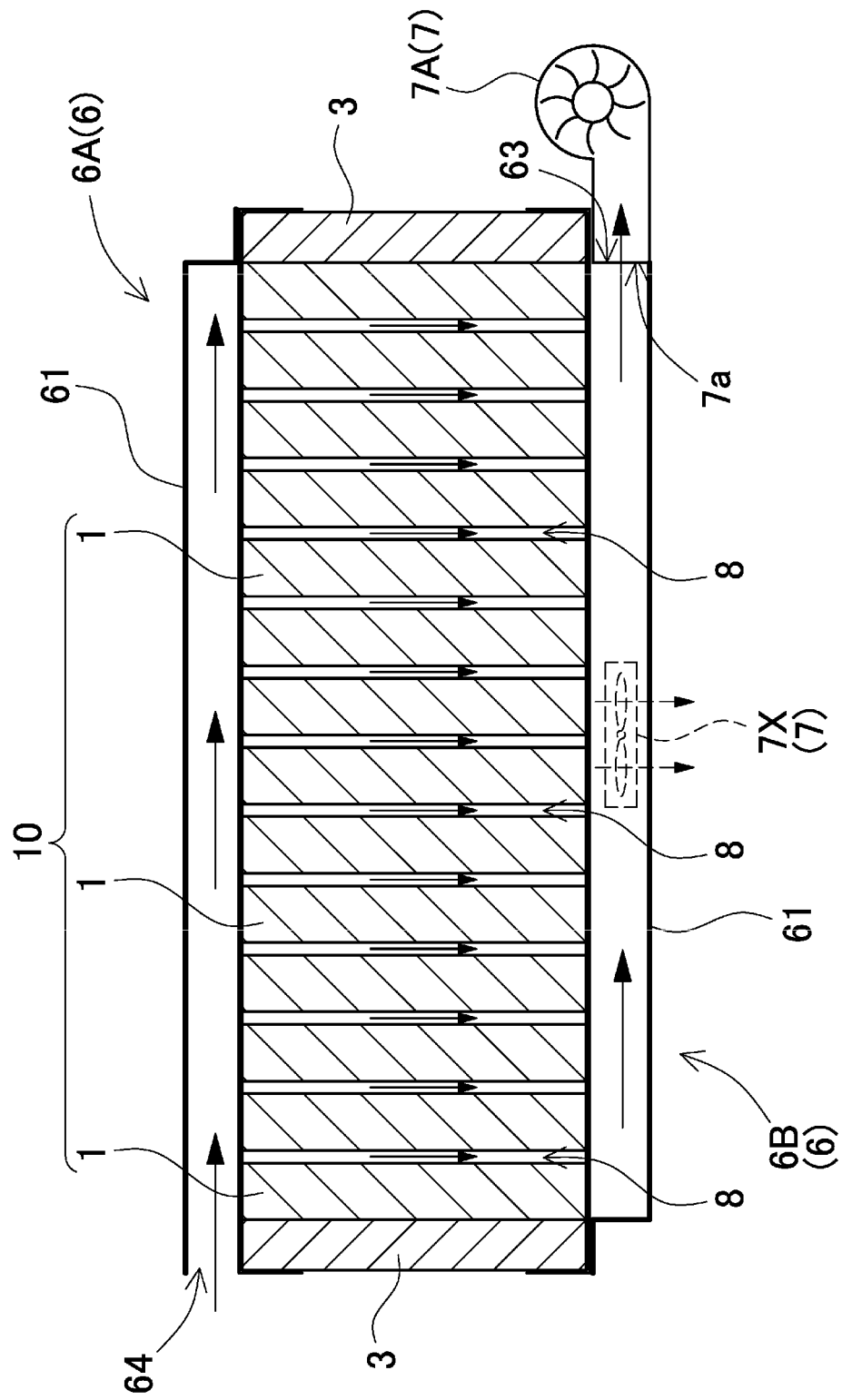
FIG. 9 is a schematic horizontal sectional view of the battery system illustrated in FIG. 1.

In battery system 100 illustrated in the perspective view of FIG. 1 and the schematic horizontal sectional view of FIG. 9, a pair of ducts 6 are disposed on both sides of battery stack 10. These ducts 6 include inflow duct 6A and exhaust duct 6B. Inflow duct 6A and exhaust duct 6B are provided on sides opposite to each other. Cooling air is blown from inflow duct 6A to exhaust duct 6B, and battery cells 1 are cooled down. A plurality of cooling paths 8 is coupled in parallel to inflow duct 6A and exhaust duct 6B. Accordingly, cooling air blown to inflow duct 6A is divided and blown to the plurality of cooling paths 8, and is blown from inflow duct 6A to exhaust duct 6B.

(Blower 7)

Blower 7 that forcibly blows cooling air is coupled to duct 6. In battery system 100 illustrated in FIGS. 1 and 9, blower 7 is coupled to exhaust duct 6B. This blower 7 forcibly sucks air and exhausts air from exhaust duct 6B, and this causes cooling air to be forcibly blown to cooling paths 8 of battery stack 10. Blower 7 forcibly sucks air and exhausts cooling air from exhaust duct 6B. Accordingly, in this battery system 100, cooling air is blown in the order of inflow duct 6A, cooling paths 8, exhaust duct 6B, and blower 7, and battery cells 1 are cooled down. A blower can be coupled to the inflow duct. This blower forcibly supplies cooling air to the inflow duct. Accordingly, in this battery system, cooling air is blown in the order of the blower, the inflow duct, the cooling paths, and the exhaust duct, and the battery cells are cooled down.

In battery system 100 illustrated in FIGS. 1 and 9, blower 7 is coupled to exhaust port 63 that is open at one end of exhaust duct 6B and at one end in a stacking direction of battery cells 1. In exhaust duct 6B, one end on an opposite side at which blower 7 is not disposed is blocked, and cooling air that is caused to pass through cooling paths 8 of battery stack 10 and flow into exhaust duct 6B can be blown to blower 7 without leakage. In addition, in a plan view of battery system 100, inflow duct 6A that is disposed on a side opposite to exhaust duct 6B is open at one end of inflow duct 6A that is located diagonally to exhaust port 63 of exhaust duct 6B that blower 7 is coupled to, so that inflow port 64 from which cooling air is caused to flow in is provided. In addition, one end on an opposite side of inflow duct 6A is blocked. With this, cooling air that flows from inflow port 64 to the inside of inflow duct 6A can pass through cooling paths 8 of battery stack 10 without leakage. As described above, in a structure in which inflow port 64 of inflow duct 6A and exhaust port 63 of exhaust duct 6B that are disposed on both sides of battery stack 10 are located diagonally, a configuration is exhibited by which air can be blown forcibly and uniformly to each of cooling paths 8, as illustrated by arrows in FIG. 9.

Blower 7 includes a fan that is rotated by a motor, and an operation of the motor is controlled by a circuit (not illustrated). The circuit controls the operation of the motor of blower 7 by using signals of temperature sensors. When a highest temperature that has been detected by the temperature sensor is higher than a set temperature, the circuit causes the motor of blower 7 to operate, and forcibly blows cooling air to cooling paths 8. When the highest temperature becomes lower than the set temperature, the circuit stops the operation of the motor. Further, the circuit can control power to be supplied to the motor according to the temperature detected by the temperature sensor so as to control battery cells 1 in a predetermined temperature range. For example, when the temperature detected by the temperature sensor becomes high, power to be supplied to the motor is gradually increased, and a blowing volume of blower 7 is increased. When the detected temperature becomes low, the power to be supplied to the motor is decreased. This enables control in a set temperature range.

As blower 7, sirocco fan 7A can be used, for example. In battery system 100 illustrated in FIGS. 1 and 9, intake port 7a of sirocco fan 7A serving as blower 7 is coupled to exhaust port 63 that is open at one end of exhaust duct 6B, and air inside of exhaust duct 6B is forcibly exhausted. This battery system 100 forcibly blows cooling air that has passed through cooling paths 8 of battery stack 10, to an outside via blower 7 that is coupled to exhaust port 63 of exhaust duct 6B.

Further, in sirocco fan 7A illustrated in FIG. 1 that serves as blower 7, a length in a rotation axis direction is greater, and an entire shape is a roughly cylinder shape. Sirocco fan 7A is coupled to exhaust port 63 of exhaust duct 6B. In this battery system 100, a rotation axis of sirocco fan 7A has a direction perpendicular to the bottom of battery stack 10. In other words, sirocco fan 7A having a roughly cylinder shape is disposed vertically. In battery system 100 illustrated in FIG. 1, sirocco fan 7A is disposed outside end plate 3, and is coupled to one end of exhaust duct 6B. Sirocco fan 7A that is coupled to duct 6 and has a roughly cylinder shape is provided with intake port 7a that extends in an axis direction in an open state, and this intake port 7a is coupled to exhaust port 63 of exhaust duct 6B. As a bower, an axial fan can be used instead of a sirocco fan.

In battery system 100 illustrated in FIGS. 1 and 9, blower 7 is coupled to one end of exhaust duct 6B. A blower does not always need to be coupled to one end of a duct. The blower can be disposed inside duct 6, as illustrated with a chain line in FIG. 9, or the blower can be disposed outside duct 6 and on a side of body 61. This blower 7X can be disposed inside or outside exhaust duct 6B in a state where a length in the rotation axis direction is shorter and an entire shape is a disc shape. This blower 7X can be disposed in such a way that a rotation axis of a fan has a direction perpendicular to a side of a battery stack and in other words, the disc-shaped blower is parallel to the side of the battery stack. In a structure in which a blower is disposed inside a duct, a configuration is exhibited by which the blower can be disposed with space saved and without an increase in size of an outer shape of a battery system. Disc-shaped blower 7X illustrated with a chain line in FIG. 9 is disposed on one side of battery stack 10 and in a center of exhaust duct 6B. In this structure, air can be exhausted from the center of exhaust duct 6B toward an outside. Therefore, in the inflow duct, inflow ports can be opened at both ends, and cooling air can be caused to flow into the inflow duct. Alternatively, an inflow port can be opened on a side of a body of the inflow duct, and cooling air can be caused to flow into the inflow duct.

Further, a blower does not always need to be directly coupled to a duct. The blower can be disposed on a path that is coupled to the duct. For example, the blower can be disposed on an exhaust path that is coupled to an exhaust duct or on an inflow path that is coupled to an inflow duct. In this battery system, the blower is not disposed near a duct, and therefore restrictions for an outer shape or configuration of the battery system can be reduced.

Second Exemplary Embodiment

Figure 10:
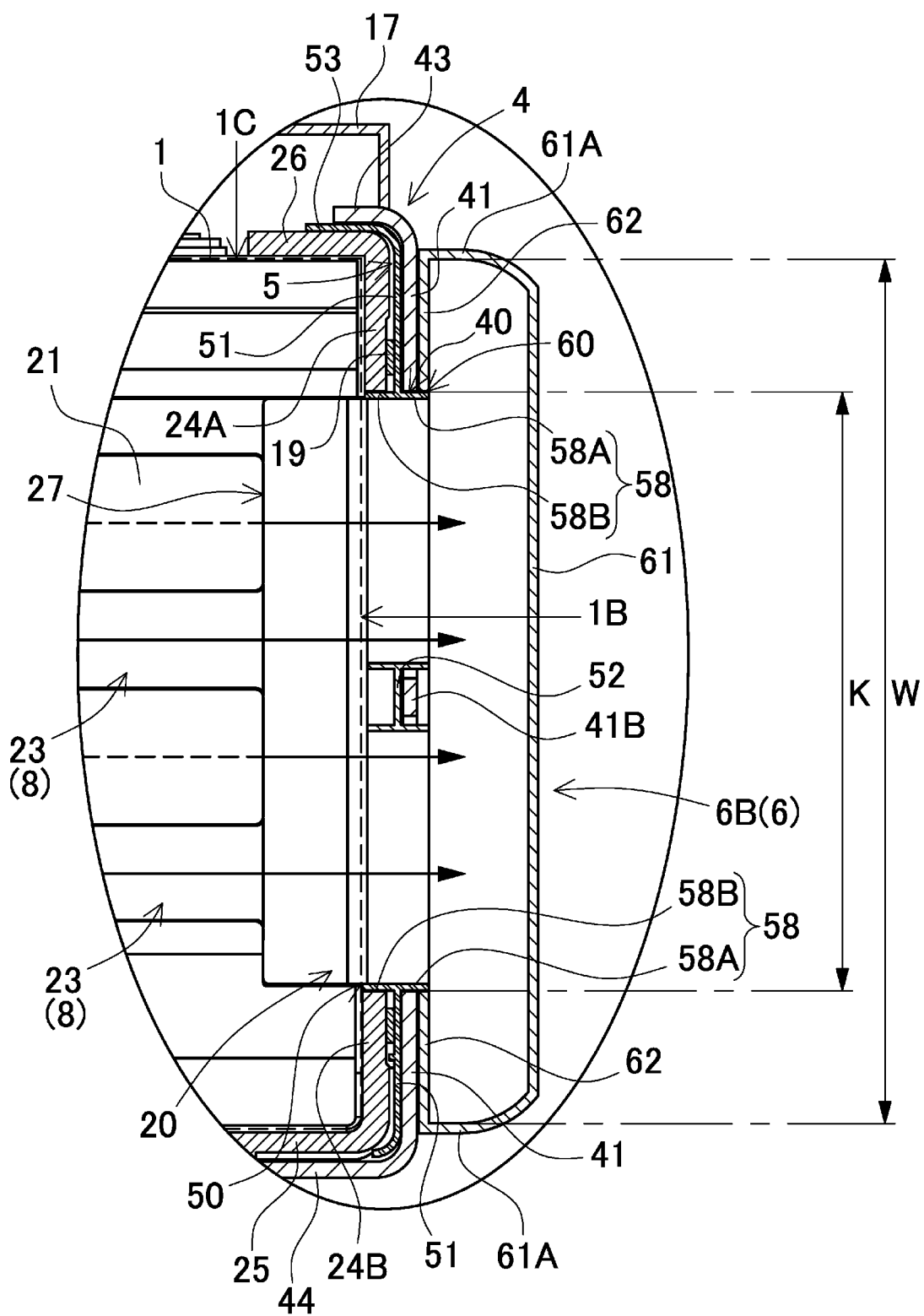
FIG. 10 is a vertical transverse sectional view of a battery system according to a second exemplary embodiment of the present invention.
Figure 11:
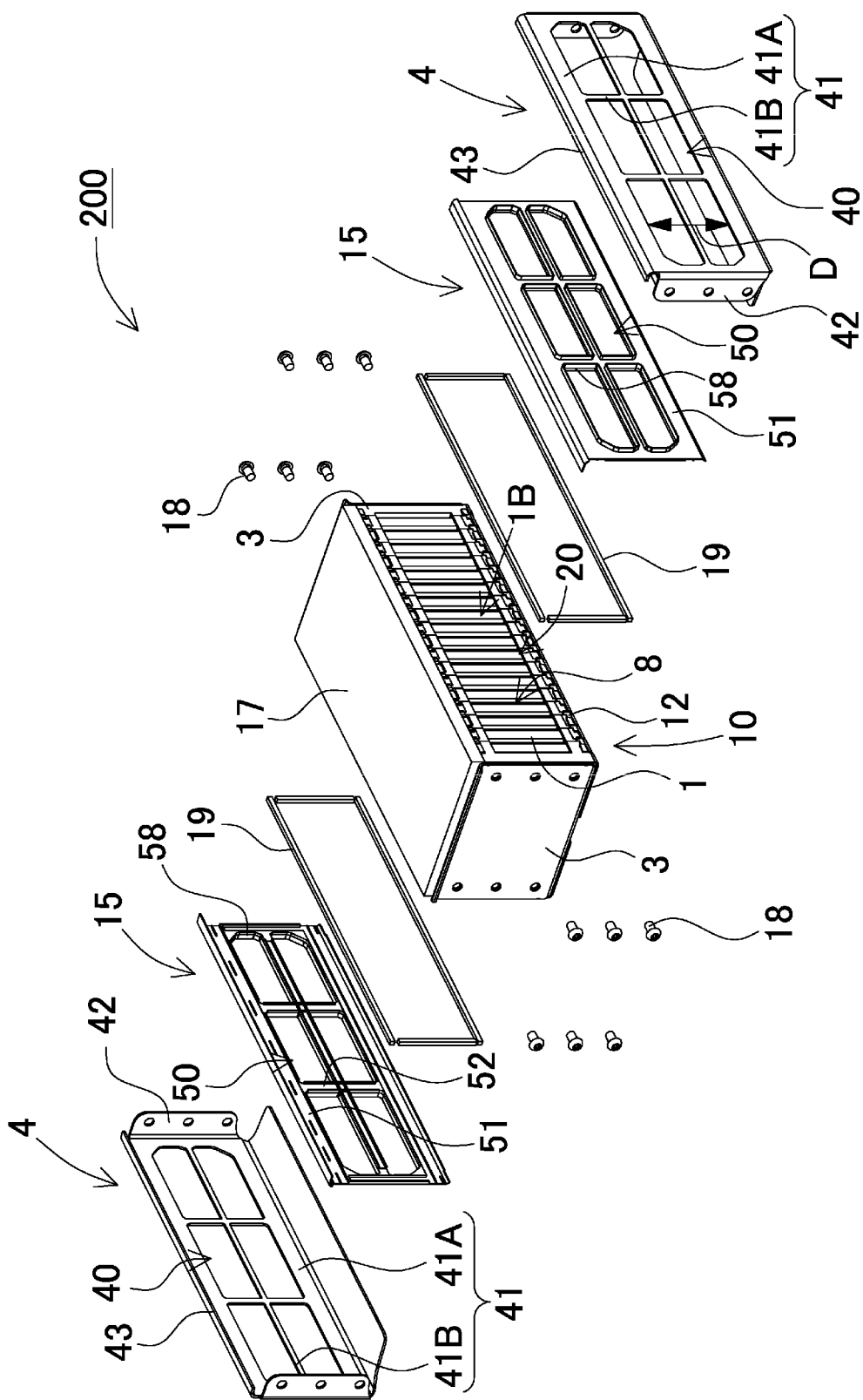
FIG. 11 is an exploded perspective view of the battery system illustrated in FIG. 10.

Further, a battery system according to a second exemplary embodiment of the present invention is illustrated in FIGS. 10 and 11. In battery system 200 illustrated in FIGS. 10 and 11, similarly to battery system 100 described above, gaps between binding bar 4 and battery stack 10 and between binding bar 4 and duct 6 are blocked with a blocking part. However, battery system 200 is different from battery system 100 in that this blocking part is not provided in separator 2, but is provided in insulating sheet 5. Accordingly, in this battery system 200, the same configuration elements as configuration elements in the exemplary embodiment described above can be employed as members other than separator 12 and insulating sheet 15. In FIGS. 10 and 11, the same configuration elements are denoted by the same reference marks as reference marks in the exemplary embodiment described above, and detailed description of the same configuration elements is omitted.

Similarly to separator 2 described above, separator 12 illustrated in FIGS. 10 and 11 has a structure in which openings 20 are provided between upper cover 24A and lower cover 24B that are provided so as to be spaced apart from each other and side face 1B of battery cell 1 is partially exposed from the openings 20. Protrusions that protrude from edges front ends of side covers 24 in a direction of both sides of battery stack 10 are not provided, and the outside of side cover 24 has a flat face shape along the inside of binding bar 4. In this separator 12, opening ends of openings 20 that are formed between upper cover 24A and lower cover 24B that face each other are covered with blocking parts 58 that are provided at an opening end of through-hole 50 of insulating sheet 15.

Insulating sheet 15 illustrated in FIG. 11 includes through-holes 50 that are open along openings 40 of binding bar 4. Blocking part 58 bent in a sectional view is formed at the opening end of this through-hole 50. Insulating sheet 15 is molded in a predetermined shape by using a resin material. As this resin material, a material obtained by adding talc to polypropylene can be used similarly to the description above. In addition, a fiber material such as carbon fiber, glass fiber, gypsum fiber, or aramid fiber can be added to a resin material of an insulating sheet molded in a shape, instead of talc or in addition to talc, so that insulating sheet 15 can be reinforced. In illustrated insulating sheet 15, a protrusion that protrudes in a thickness direction of insulating sheet 15 and has a short cylindrical shape is provided in flat face 51 having a predetermined thickness, so that blocking part 58 is formed. Blocking part 58 of FIG. 11 is a T-shape in a sectional view. One shoulder 58A of the T-shape covers opening ends of openings 40 and an opening end of opening 60, and the other shoulder 58B of the T-shape covers opening ends of openings 20. Illustrated blocking part 58 is formed in a cylindrical shape along an inner peripheral face of opening 40 provided in binding bar 4 and in a shape that protrudes from flat face 51 of insulating sheet 15 by a predetermined height. Therefore, blocking part 58 is held in a predetermined shape.

In this insulating sheet 15, a protrusion serving as one shoulder 58A that protrudes from the opening end of through-hole 50 in an outward direction is inserted into opening 40 of binding bar 4 in a mating state, and an edge of blocking part 58 that covers opening 40 is extended to the inside of duct 6. An opening end of opening 40 and an opening end of opening 60 are covered with this blocking part 58. In addition, in this insulating sheet 15, a protrusion serving as the other shoulder 58B that protrudes from the opening end of through-hole 50 in an inward direction is inserted into opening 20 of separator 12 in a mating state. A lower edge of upper cover 24A is covered on an upper side of blocking part 58, and an upper edge of lower cover 24B is covered on a lower side of blocking part 58.

This insulating sheet 15 includes blocking parts 58. Blocking part 58 includes shoulders 58A, 58B that protrude in both directions crossing each other so as to have a T-shape in a sectional view with respect to flat face 51 that is formed along peripheral edge plate 41A of binding bar 4. With this, this blocking part 58 is held in a predetermined shape, is fitted along opening 20 of separator 12 and opening 40 of binding bar 4, and further along opening 60 of duct 6, and covers respective opening ends. With this, insulating sheet 15 contacts air tightly with opening ends of separator 12, binding bar 4, and duct 6, inflow of air from gaps between insulating sheet 15 and separators 12, between insulating sheet 15 and binding bar 4, and between duct 6 and binding bar 4 is suppressed, and a reduction in cooling capability can be prevented.

The battery system described above is optimal for a battery system that supplies power to a motor that causes an electric vehicle to travel. As an electric vehicle mounted with a battery system, a hybrid vehicle or a plug-in hybrid vehicle that travels by using both an engine and a motor, an electric automobile that travels by only using a motor, or other vehicles can be used. The battery system can be used for a power source of the vehicle described above. In order to obtain power used to drive a vehicle, a high-capacity and high-output battery system can be constructed and mounted in which many battery cells described above are connected in series or in parallel and a required circuit is further added.

(Battery System for Hybrid Vehicle)

Figure 12:
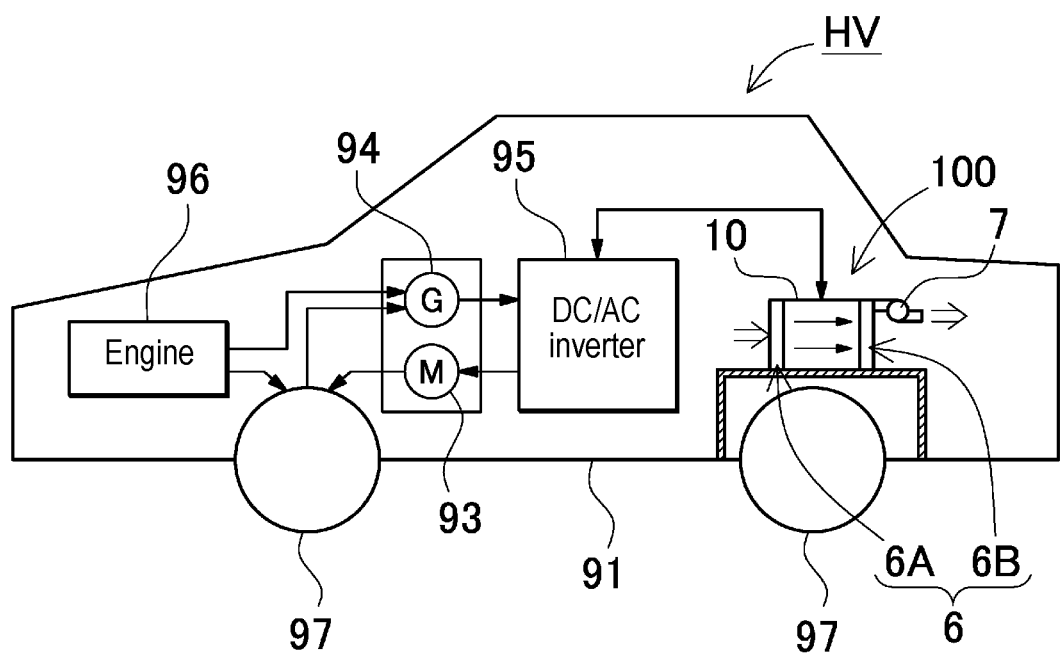
FIG. 12 is a block diagram illustrating an example in which a battery system is mounted on a hybrid vehicle that travels by using an engine and a motor.

FIG. 12 illustrates an example in which a battery system is mounted on a hybrid vehicle that travels by using both an engine and a motor. Vehicle HV illustrated in FIG. 12 that is mounted with the battery system includes vehicle body 91, engine 96 and motor 93 for traction that cause this vehicle body 91 to travel, wheels 97 that are driven by these engine 96 and motor 93 for traction, battery system 100 that supplies power to motor 93, and power generator 94 that charges a battery of battery system 100. Battery system 100 is connected to motor 93 and power generator 94 via inverter 95. Vehicle HV travels by using both motor 93 and engine 96 while charging and discharging the battery of battery system 100. Motor 93 is driven in a state with poor engine efficiency, for example, during acceleration or during travelling at low speed, so as to cause the vehicle to travel. Motor 93 receives power from battery system 100, and is driven. Power generator 94 is driven by engine 96 or is driven by regenerative braking at a time of braking the vehicle, and power generator 94 charges the battery of battery system 100.

(Battery System for Electric Automobile)

Figure 13:
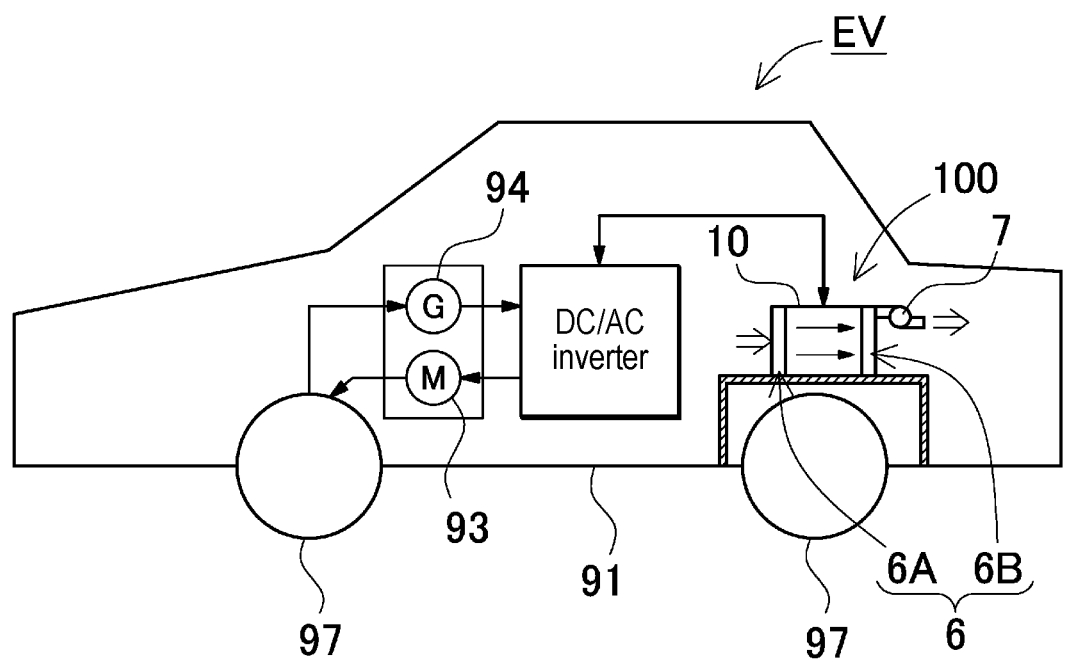
FIG. 13 is a block diagram illustrating an example in which a battery system is mounted on an electric automobile that travels by only using a motor.
Figure 14:
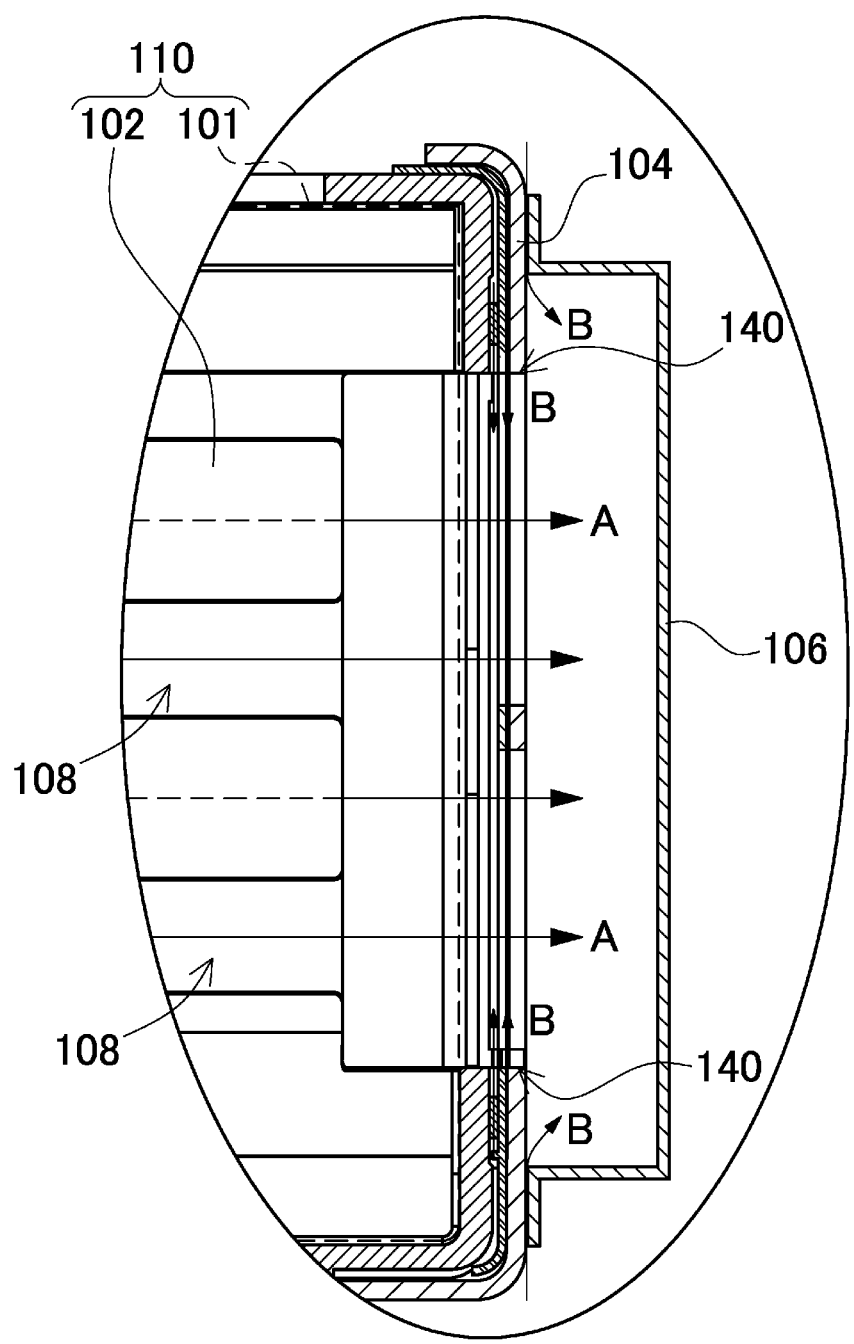
FIG. 14 is a vertical transverse sectional view of a conventional battery system.

In addition, FIG. 13 illustrates an example in which a battery system is mounted on an electric automobile that travels by only using a motor. Vehicle EV illustrated in FIG. 13 that is mounted with a battery system includes vehicle body 91, motor 93 for traction that causes this vehicle body 91 to travel, wheels 97 that are driven by this motor 93, battery system 100 that supplies power to this motor 93, and power generator 94 that charges a battery of this battery system 100. Battery system 100 is connected to motor 93 and power generator 94 via inverter 95. Motor 93 receives power from battery system 100, and is driven. Power generator 94 is driven by energy at a time when regenerative braking is applied to vehicle EV, and power generator 94 charges the battery of battery system 100.

The vehicles illustrated in FIGS. 12 and 13 are mounted with battery system 100 in their rear. In battery system 100 mounted on the vehicle, it is preferable that an intake port of air serving as an inflow of inflow duct 6A be provided on a cabin of the vehicle. This battery system sucks air in the cabin, therefore air in the cabin that has been adjusted to have an appropriate temperature can be blown as cooling air to battery cells 1, and battery cells 1 can be cooled down. This is because an inside of the cabin of the vehicle is normally held to have a temperature of about 25 degrees. Accordingly, by sucking air inside the cabin and blowing the air to cooling paths, temperature of cooling air can be kept to be stable regardless of season or weather.

In particular, the battery system described above can effectively prevent inflow of air from gaps between a binding bar and a battery stack and between the binding bar and a duct. This can effectively prevent a reduction in cooling capability that results from unintended air intake.

INDUSTRIAL APPLICABILITY

A battery system according to the present invention is optimally used as a power source for a vehicle that supplies power to a motor of a vehicle requiring large power.

REFERENCE MARKS IN THE FIGS.

100, 200 battery system
1 battery cell
1A principal face
1B side face
1C terminal face
1D bottom face
2, 12 separator
3 end plate
4 binding bar
5, 15 insulating sheet
6, 16 duct
6A inflow duct
6B exhaust duct
7, 7X blower
7A sirocco fan
7a intake port
8 cooling path
10 battery stack
11 electrode terminal
13 bus bar
17 cover case
18 setscrew
19 cushioning material
20 opening
21 plate
22 peripheral wall
23 groove
24 side cover
24A upper cover
24B lower cover
25 bottom cover
26 upper cover
27 cutout recess
28 blocking part
29 hook
40 opening
41 side plate
41A peripheral edge plate
41B coupling bar
42 fixing part
43 upper side locking part
44 bottom side locking part
50 through-hole
51 flat face
52 intermediate coupling part
53 guide groove
58 blocking part (including 58A and 58B)
58A shoulder
58B shoulder
60 opening
61 body
61A facing wall
62 bent part
63 exhaust port
64 inflow port
91 vehicle body
93 motor
94 power generator
95 inverter
96 engine
97 wheel
101 battery cell
102 separator
104 binding bar
106 duct
108 cooling path
110 battery stack
140 opening
HV vehicle
EV vehicle

The invention claimed is:

1. A battery system comprising:
a battery stack that includes a plurality of battery cells and separators being stacked alternatively one by one and has first openings on each of opposite longer sides of the battery stack, the plurality of battery cells having a prismatic shape and being stacked in a thickness direction, the separator having insulation, being interposed between adjacent battery cells of the plurality of battery cells, and forming cooling paths between the adjacent battery cells, the first openings communicating with a plurality of the cooling paths;
a pair of end plates that are respectively disposed on both shorter sides of the battery stack;
a pair of binding bars that are disposed on both longer sides of the battery stack, both ends of the pair of binding bars being fixed to the pair of end plates, each of the pair of binding bars including second openings that are open so as to face the first openings and that causes cooling air to flow into the plurality of the cooling paths; and a duct that is disposed on at least one of the opposite longer sides of the battery stack, wherein the duct covers the second openings of a corresponding one of the pair of binding bars, and guides the cooling air that cools down the plurality of battery cells, wherein the battery system forcibly blows the cooling air to the duct, and cools down the plurality of battery cells, the duct includes a third opening that is formed along the second openings of the corresponding one of the pair of binding bars, and opening ends of the second openings and an opening end of the third opening are close to each other, and a blocking part is formed in the separator, the blocking part protruding in a direction perpendicular to the thickness direction and extending along the second openings, wherein the blocking part is inserted through the second openings into the third opening, and covers the opening ends of the second openings and the opening end of the third opening, wherein a portion of the blocking part directly contacts a portion of the duct.

2. The battery system according to claim 1, further comprising insulating sheets is interposed between the battery stack and each of the pair of binding bars on the opposite longer sides of the battery stack, wherein each of the insulating sheets includes through-holes that are open along the second openings of a corresponding one of the pair of binding bars, and opening ends of the through-holes and the opening ends of the second openings are close to each other, and the blocking part of the separator covers the opening ends of the through-holes.

3. The battery system according to claim 1, wherein the separator includes a plate and a peripheral wall, the plate being interposed between the adjacent battery cells, the peripheral wall being provided along an outer periphery of the plate and protruding in a stacking direction of the plurality of battery cells, the peripheral wall includes side covers that are located outside each of both sides of each of the plurality of battery cells, the side covers being spaced apart from each other on upper and lower sides, and the openings are provided between the side covers that are located on the upper and lower sides and face each other, the openings causing each of both end openings of the cooling path to communicate with an outside of the battery stack, and each of the side covers is provided with a protrusion that is bent in a sectional view and serves as the blocking part.

4. The battery system according to claim 1, wherein the duct includes a body formed in a groove shape having a pair of walls facing each other, wherein respective distal ends of the pair of walls are bent inward to form opposite bent parts, such that the third opening is formed between the opposite bent parts, and an interval between edges of the opposite bent parts facing each other, defining a dimension of the third opening, is nearly equal to an opening width of the second openings, and is smaller than a groove width of the body.

5. The battery system according to claim 1, further comprising a blower that forcibly blows the cooling air to the duct, wherein, from among a pair of the ducts that are respectively disposed the opposite longer sides of the battery stack, one of the pair of ducts serves as an inflow duct and the other of the pair of ducts serves as an exhaust duct, and the blower is coupled to the exhaust duct.

6. A vehicle that is equipped with the battery system according to claim 1, the vehicle comprising:

the battery system;

a motor for traction that receives power from the battery system;

a vehicle body mounted with the battery system and the motor; and wheels that are driven by the motor and cause the vehicle body to travel.

7. A battery system comprising:

a battery stack that includes a plurality of battery cells and separators being stacked alternatively one by one and has first openings on each of opposite longer sides of the battery stack, the plurality of battery cells having a prismatic shape and being stacked in a thickness direction, the separator having insulation, being interposed between adjacent battery cells of the plurality of battery cells, and forming cooling paths between the adjacent battery cells, the first openings communicating with a plurality of the cooling paths;

a pair of end plates that are respectively disposed on both shorter sides of the battery stack;

a pair of binding bars that are disposed on both longer sides of the battery stack, both ends of the pair of binding bars being fixed to the pair of end plates, each of the pair of binding bars including second openings that are open so as to face the first openings and that cause cooling air to flow into the plurality of the cooling paths;

insulating sheets interposed between the battery stack and each of the pair of binding bars on the opposite longer sides of the battery stack, wherein each of the insulating sheets includes through-holes that are open along the second openings of a corresponding one of the pair of binding bars; and a duct that is disposed on at least one of the opposite longer sides of the battery stack, wherein the duct covers the second openings of a corresponding one of the pair of binding bars, and guides the cooling air that cools down the plurality of battery cells, wherein the battery system forcibly blows the cooling air to the duct, and cools down the plurality of battery cells, the duct includes a third opening that is formed along the second openings of the corresponding one of the pair of binding bars, and an opening end of the third opening of the duct and opening ends of the second openings are close to each other, and in the insulating sheet, a blocking part is formed at an opening end of the through-hole, and the blocking part is bent in a sectional view so as to cover opening ends of the first openings, the opening ends of the second openings, and the opening end of the third opening, wherein a portion of the blocking part directly contacts a portion of the duct.

8. The battery system according to claim 7, wherein the blocking part is a T-shape in the sectional view, one shoulder of the T-shape is inserted into the third opening, and covers the opening ends of the second openings and the opening end of the third opening of the duct, and the other shoulder of the T-shape is inserted into the first openings, and covers the opening ends of the first openings.

9. The battery system according to claim 7, wherein
the duct includes a body formed in a groove shape having a pair of walls facing each other, wherein respective distal ends of the pair of walls are bent inward to form opposite bent parts, such that the third opening is formed between the opposite bent parts, and
an interval between edges of the opposite bent parts facing each other, defining a dimension of the third opening, is nearly equal to an opening width of the second openings, and is smaller than a groove width of the body.

10. The battery system according to claim 7, further comprising a blower that forcibly blows the cooling air to the duct,
wherein, from among a pair of the ducts that are respectively disposed the opposite longer sides of the battery stack, one of the pair of ducts serves as an inflow duct and the other of the pair of ducts serves as an exhaust duct, and the blower is coupled to the exhaust duct.

11. A vehicle that is equipped with the battery system according to claim 7, the vehicle comprising:
the battery system;
a motor for traction that receives power from the battery system;
a vehicle body mounted with the battery system and the motor; and
wheels that are driven by the motor and cause the vehicle body to travel.

* * * * *